(12) United States Patent
Payne

(10) Patent No.: US 9,309,690 B1
(45) Date of Patent: Apr. 12, 2016

(54) READILY INSTALLABLE FENCE SYSTEM, AND METHOD THEREFOR

(75) Inventor: John F. Payne, Ennis, TX (US)

(73) Assignee: Betafence USA LLC, Ennis, TX (US)

( * ) Notice: Subject to any disclaimer, the term of this patent is extended or adjusted under 35 U.S.C. 154(b) by 0 days.

(21) Appl. No.: 11/669,943

(22) Filed: Jan. 31, 2007

Related U.S. Application Data

(60) Provisional application No. 60/763,715, filed on Jan. 31, 2006.

(51) Int. Cl.
*E04H 17/00* (2006.01)
*E04H 17/14* (2006.01)

(52) U.S. Cl.
CPC .................................. *E04H 17/143* (2013.01)

(58) Field of Classification Search
CPC .............. E04H 17/1426; E04H 17/143; E04H 17/1434; E04H 2017/146
USPC .......................... 256/21, 22, 73, 65.15; 49/381
See application file for complete search history.

(56) References Cited

U.S. PATENT DOCUMENTS

| | | | | |
|---|---|---|---|---|
| 447,231 A * | 2/1891 | Cleaveland | ................. | 256/65.08 |
| 508,573 A * | 11/1893 | Jester et al. | ..................... | 49/236 |
| 1,024,858 A * | 4/1912 | Kissinger et al. | ................ | 256/59 |
| 1,794,467 A * | 3/1931 | Lucas | ............................ | 362/152 |
| 2,150,651 A * | 3/1939 | Ewing | ............................ | 403/201 |
| 2,773,674 A * | 12/1956 | Fischer et al. | ................... | 256/22 |
| 2,785,877 A * | 3/1957 | Parks | .............................. | 256/34 |
| 3,108,787 A * | 10/1963 | Case | ................................. | 256/69 |
| 3,484,827 A * | 12/1969 | Hall | ................................. | 256/59 |
| 3,648,981 A * | 3/1972 | Allen | ................................ | 256/24 |
| 3,921,960 A * | 11/1975 | Bright | ........................ | 256/65.12 |
| 4,149,701 A * | 4/1979 | Densen | ........................ | 256/65.03 |
| 4,300,313 A * | 11/1981 | Steinke | ............................ | 49/463 |
| 4,628,635 A * | 12/1986 | Maillard | ............................ | 49/55 |
| 4,630,396 A * | 12/1986 | Zvi et al. | ............................. | 49/55 |
| 4,723,374 A * | 2/1988 | Peterson et al. | ................. | 49/404 |
| 5,042,557 A * | 8/1991 | Norsworthy | ................. | 160/351 |
| 5,354,036 A * | 10/1994 | Brown | ............................. | 256/25 |
| 5,628,494 A * | 5/1997 | Arnold | ............................. | 256/24 |
| 5,799,929 A * | 9/1998 | Meglino et al. | ................ | 256/34 |
| 5,868,382 A * | 2/1999 | Groves | ............................. | 256/73 |
| 6,061,991 A * | 5/2000 | Dahl | ............................... | 52/832 |
| 6,126,146 A * | 10/2000 | Melton | ........................... | 256/34 |
| 6,151,852 A * | 11/2000 | Linn et al. | ....................... | 52/239 |
| 6,290,213 B1 * | 9/2001 | Laird et al. | ................. | 256/65.05 |
| 6,513,566 B2 * | 2/2003 | Larin | ............................ | 160/351 |
| 6,712,340 B1 * | 3/2004 | Clarmont | ........................ | 256/19 |
| 6,739,093 B1 * | 5/2004 | Holbert | ............................ | 49/394 |
| 6,874,767 B1 * | 4/2005 | Gibbs | ......................... | 256/65.08 |
| 7,086,642 B1 * | 8/2006 | O'Brien | ............................ | 256/73 |
| 7,188,826 B1 * | 3/2007 | Gibbs | .............................. | 256/22 |
| 7,322,153 B2 * | 1/2008 | Nitz et al. | ........................ | 49/57 |
| D572,374 S * | 7/2008 | Gibbs | ........................... | D25/119 |
| 7,441,751 B1 * | 10/2008 | Gibbs | .............................. | 256/23 |
| 7,478,797 B2 * | 1/2009 | Laws et al. | ....................... | 256/19 |

(Continued)

FOREIGN PATENT DOCUMENTS

DE 1684770 A1 * 3/1979

*Primary Examiner* — Joshua Kennedy
(74) *Attorney, Agent, or Firm* — Baker Botts L.L.P.

(57) ABSTRACT

A fence includes a plurality of posts, and fence panels having rails which extend across the plurality of posts, and are secured thereto. Jambs may be formed onto the fence system, and one or more gates may be hung to the jambs.

17 Claims, 27 Drawing Sheets

(56) References Cited

U.S. PATENT DOCUMENTS

| | | | |
|---|---|---|---|
| 2003/0066996 A1* | 4/2003 | Cook et al. | 256/65.15 |
| 2005/0127345 A1* | 6/2005 | Giacchino | 256/59 |
| 2005/0189530 A1* | 9/2005 | Ohanesian | 256/19 |
| 2006/0151770 A1* | 7/2006 | Payne | 256/45 |
| 2006/0202186 A1* | 9/2006 | Rowley et al. | 256/67 |
| 2006/0214149 A1* | 9/2006 | Hung | 256/22 |
| 2006/0231821 A1* | 10/2006 | Gavin | 256/73 |
| 2007/0131919 A1* | 6/2007 | Crumrine | 256/22 |

* cited by examiner

FIG. 15
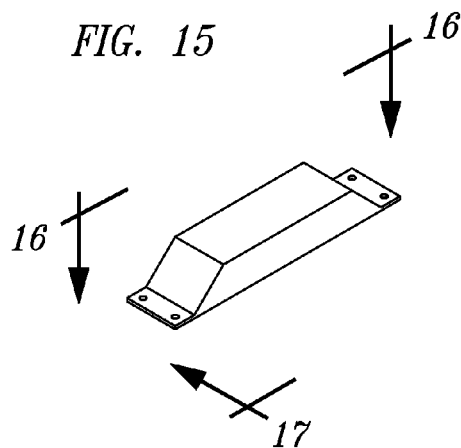
FIG. 16
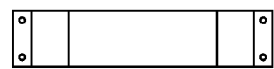
FIG. 17
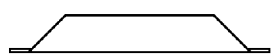
FIG. 18
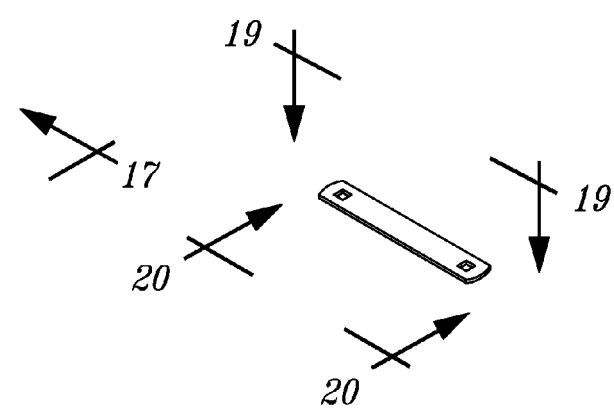
FIG. 19
FIG. 20
FIG. 21
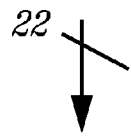
FIG. 22
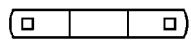
FIG. 23
FIG. 24

FIG. 25
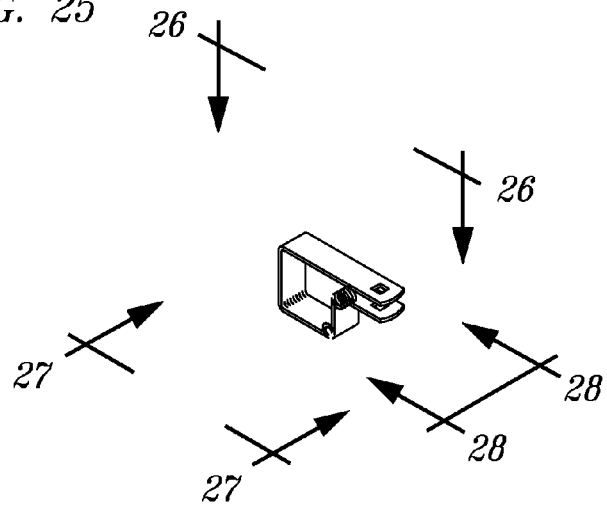
FIG. 26    FIG. 27    FIG. 28
  
FIG. 29
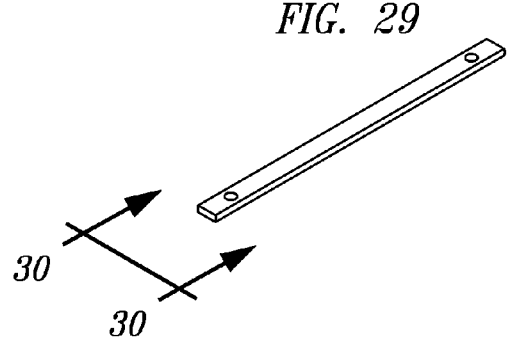
FIG. 30
FIG. 31    FIG. 32
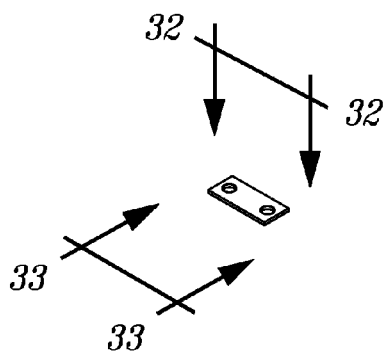
FIG. 33

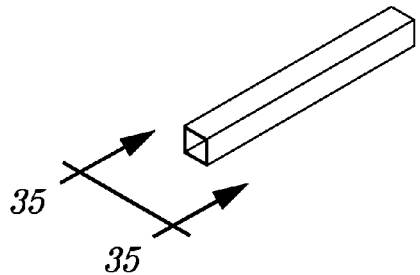
FIG. 34
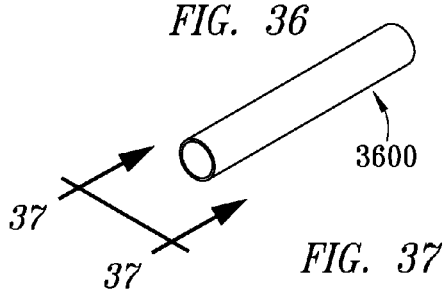
FIG. 36
FIG. 35
FIG. 37
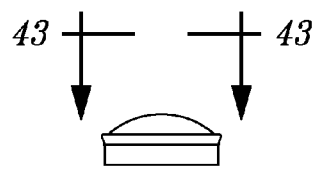
FIG. 42
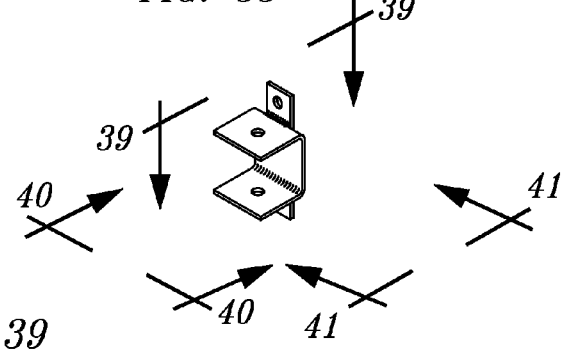
FIG. 38
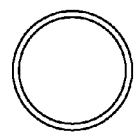
FIG. 43
FIG. 39
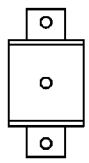
FIG. 40
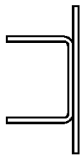
FIG. 41
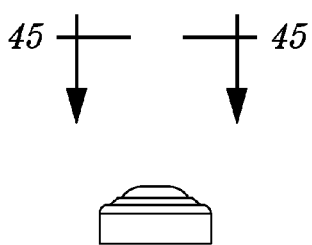
FIG. 44
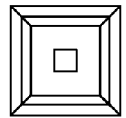
FIG. 45
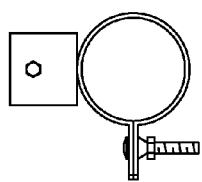
FIG. 46
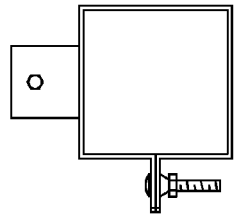
FIG. 47

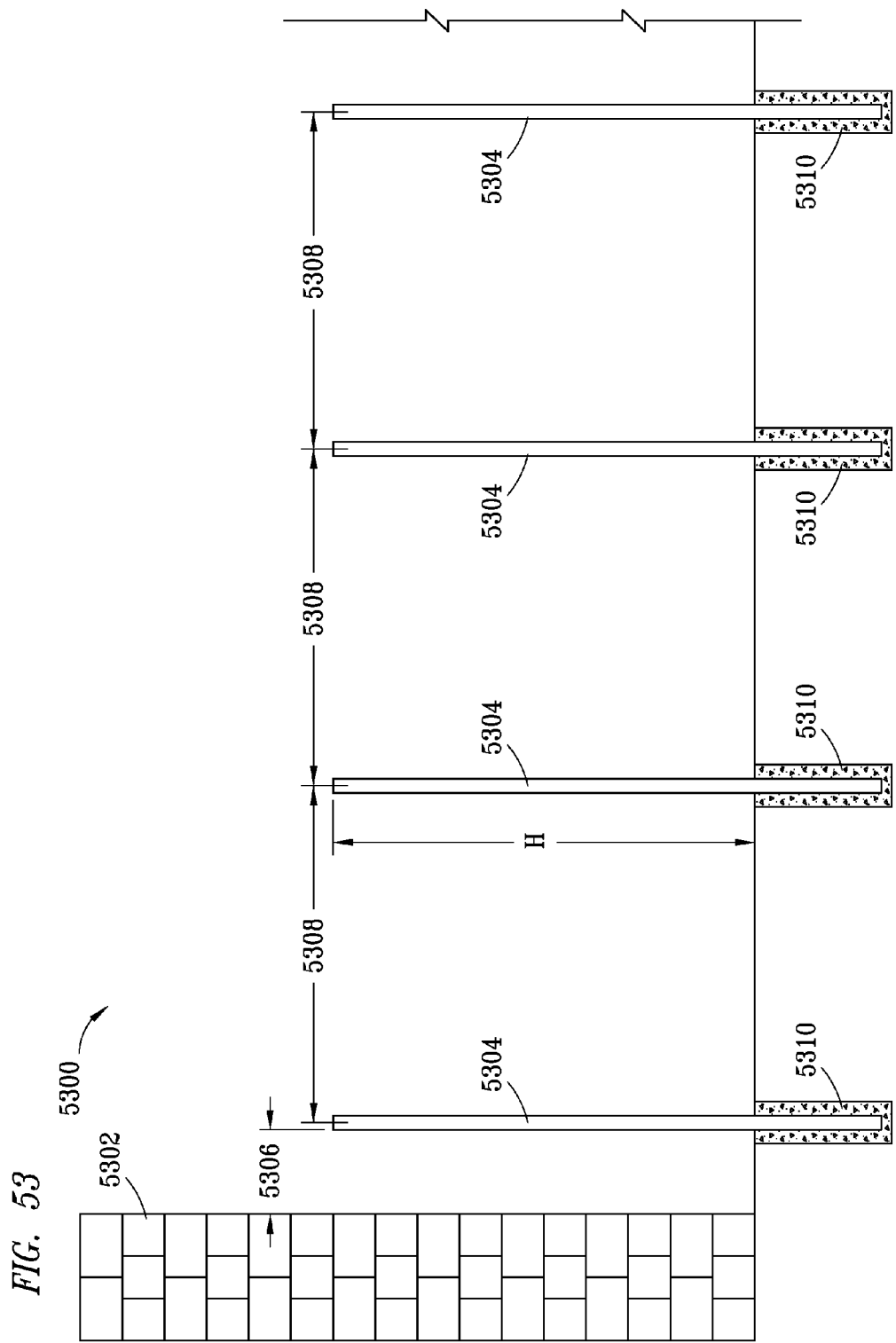

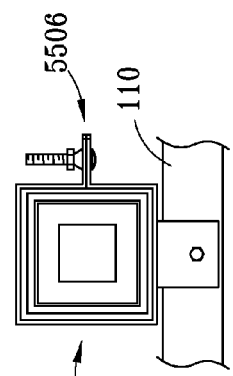
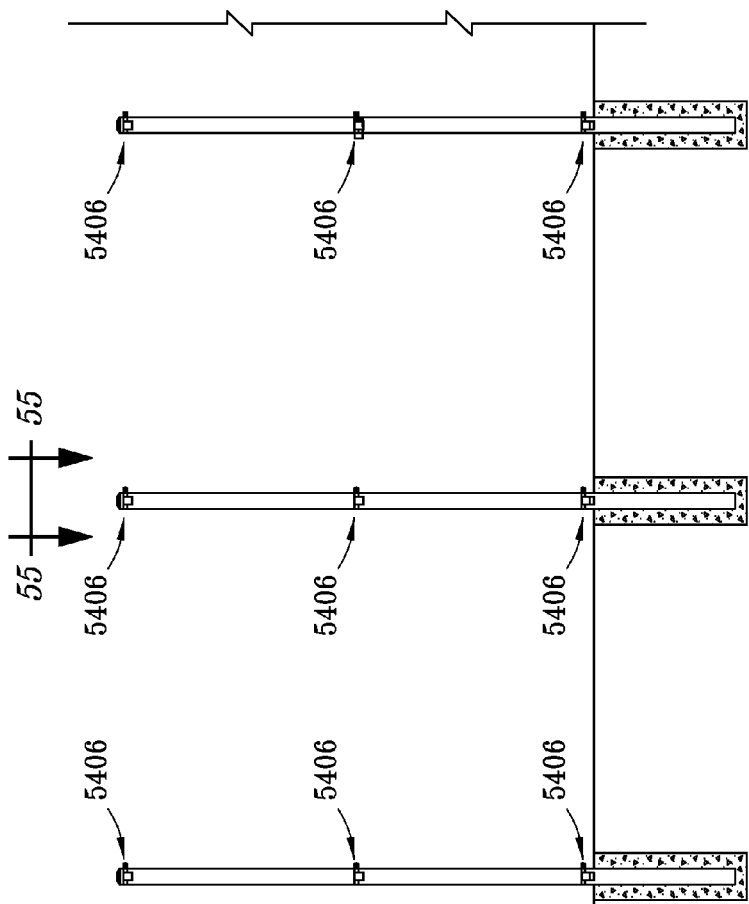
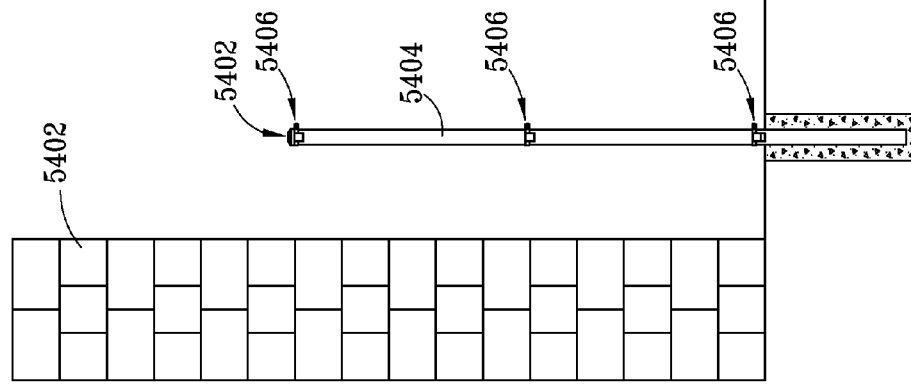

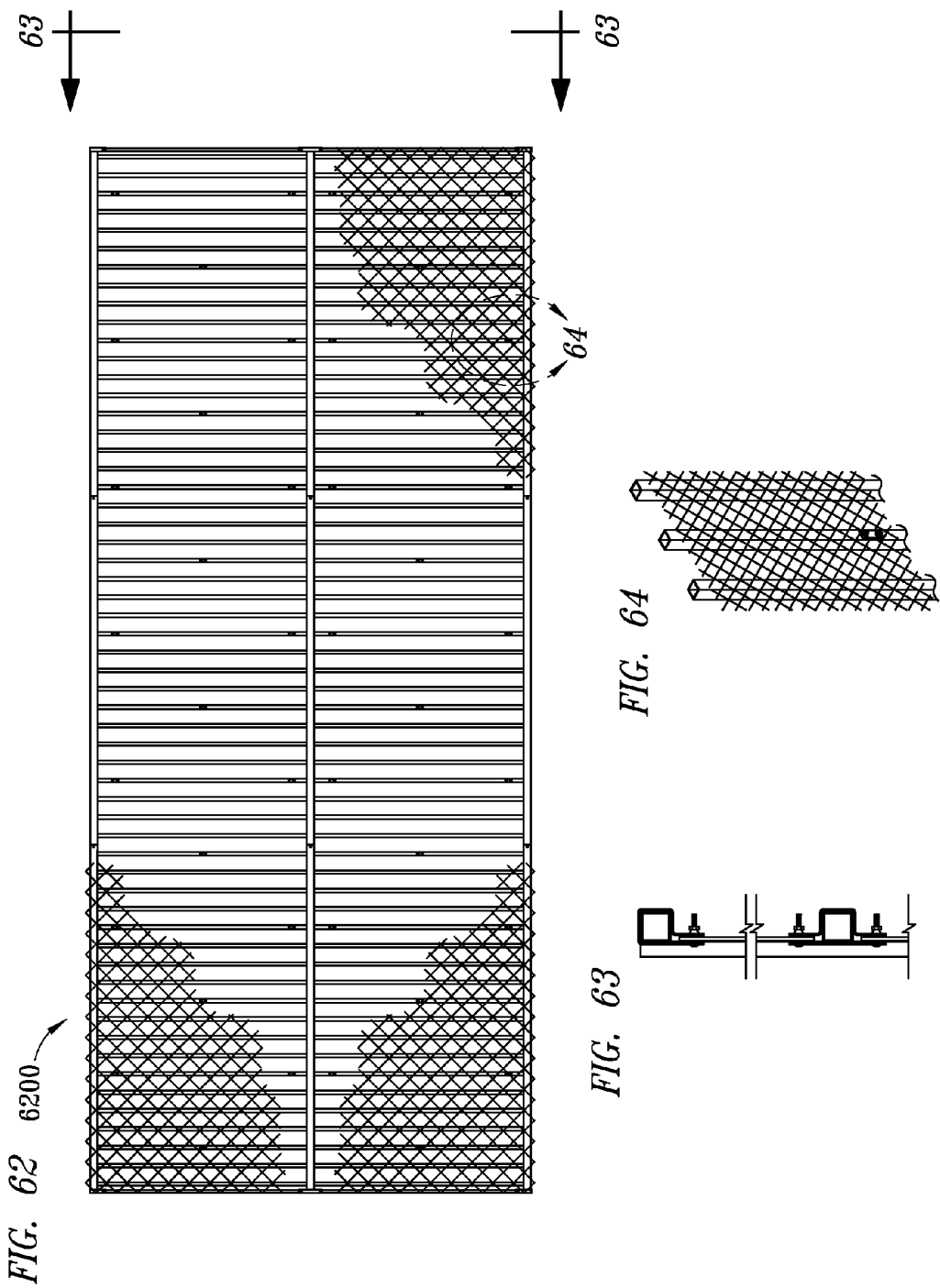

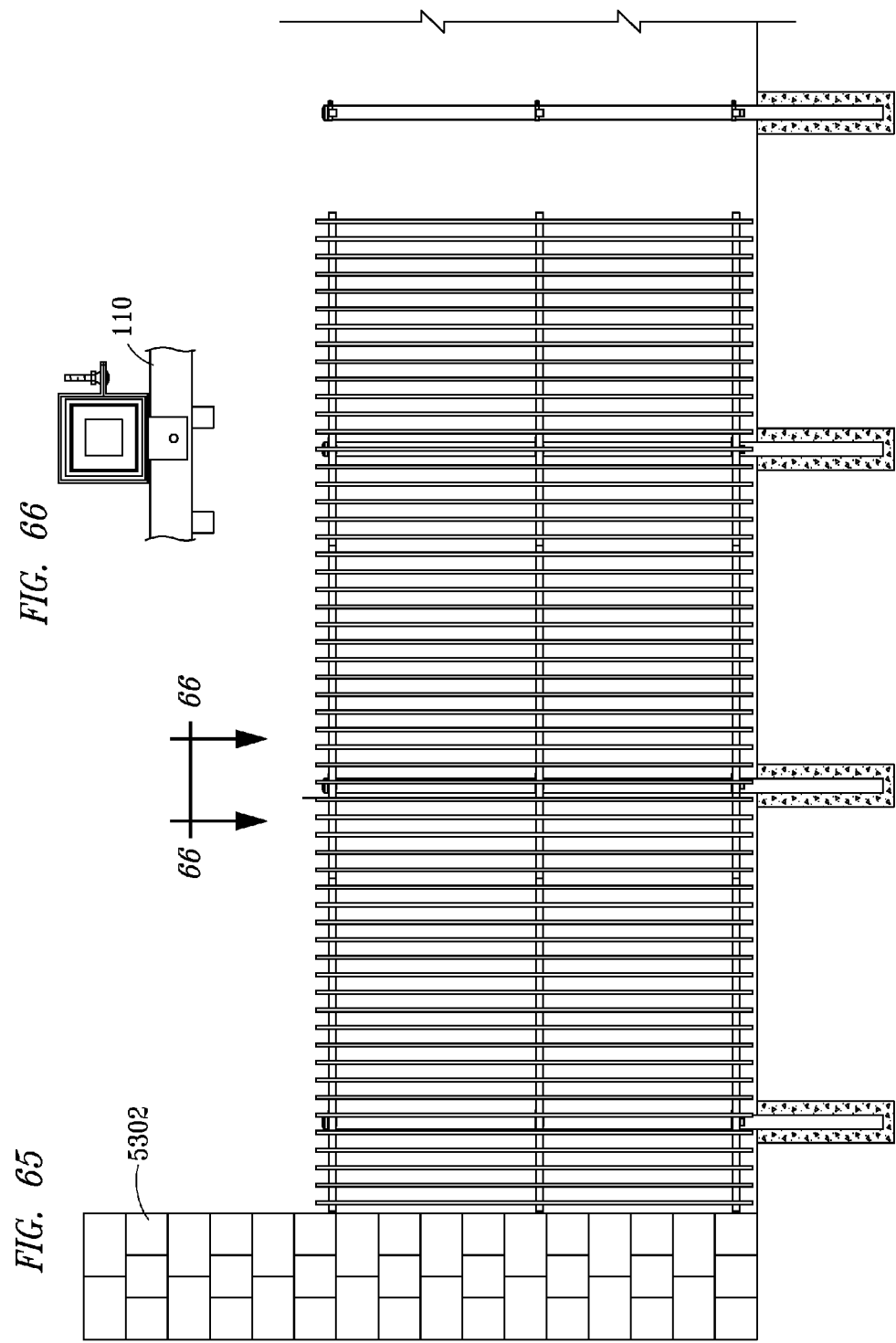

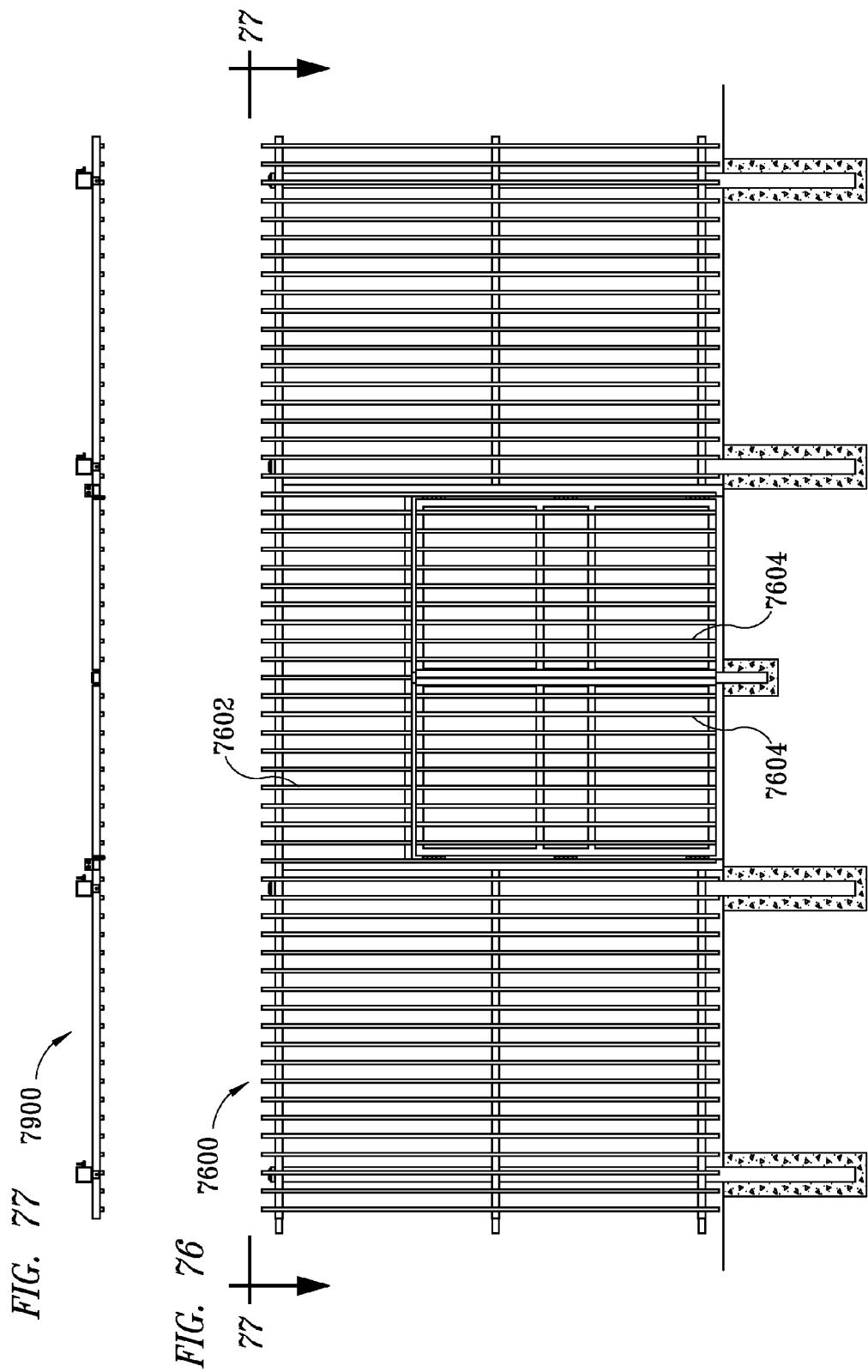

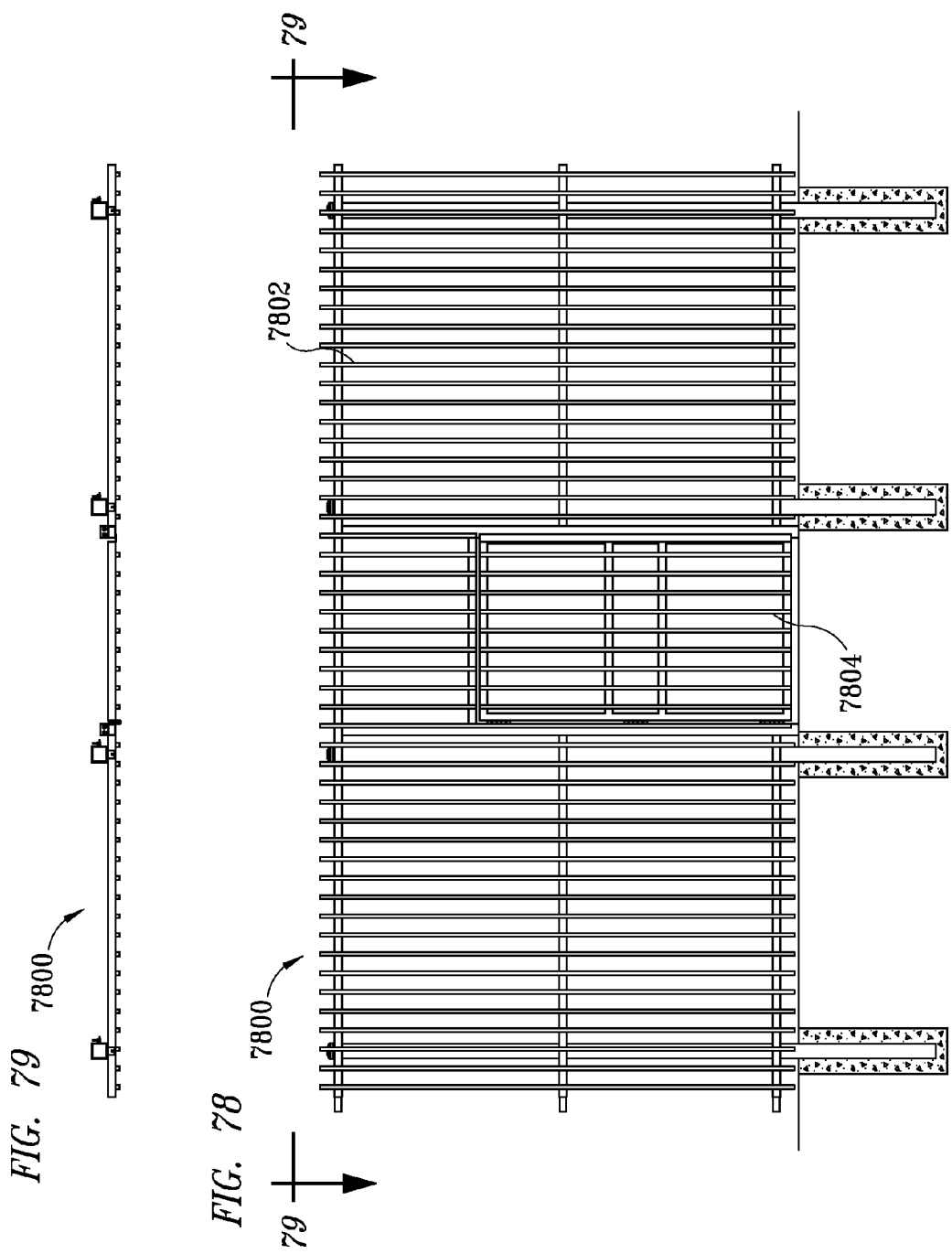

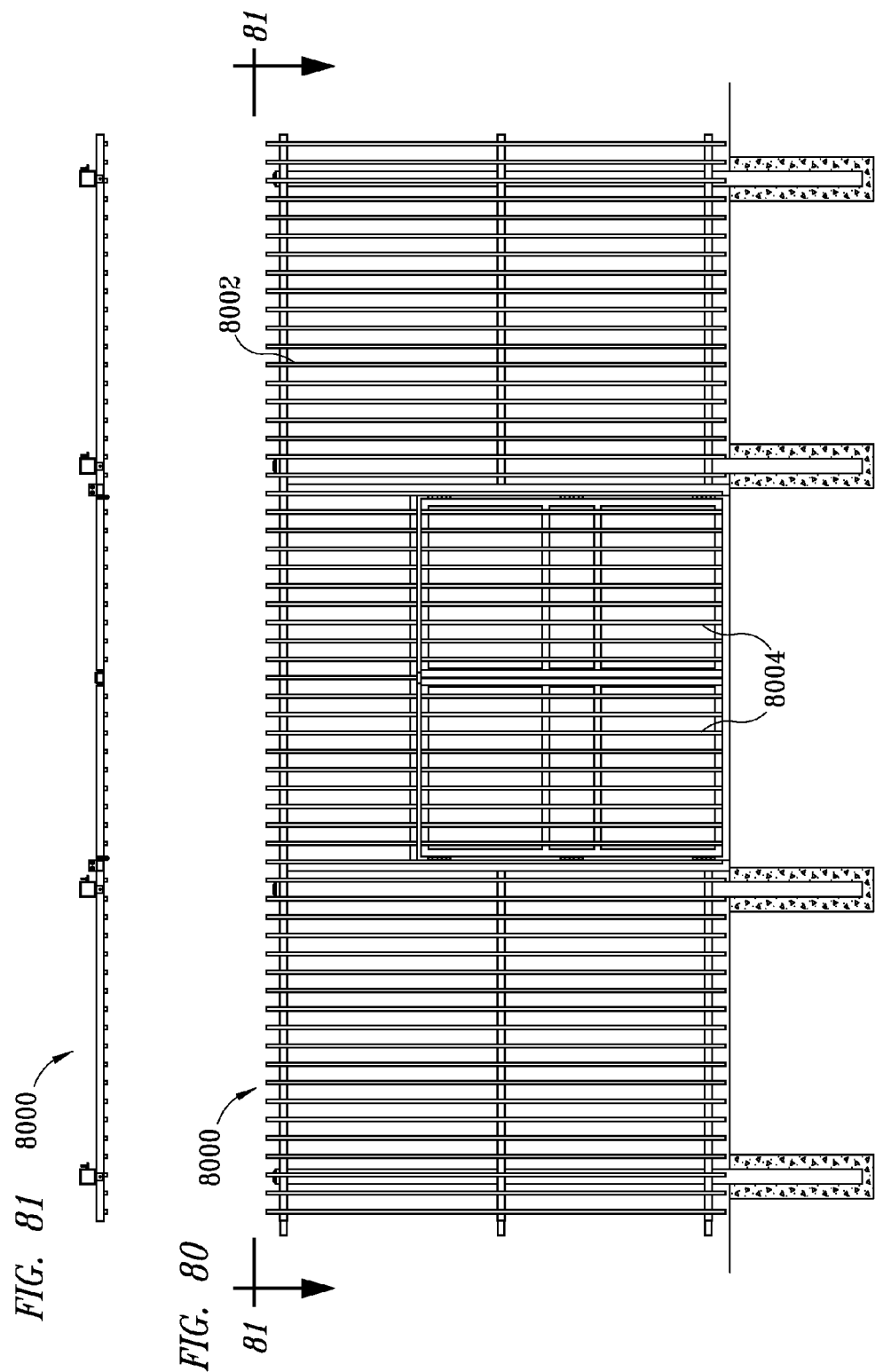

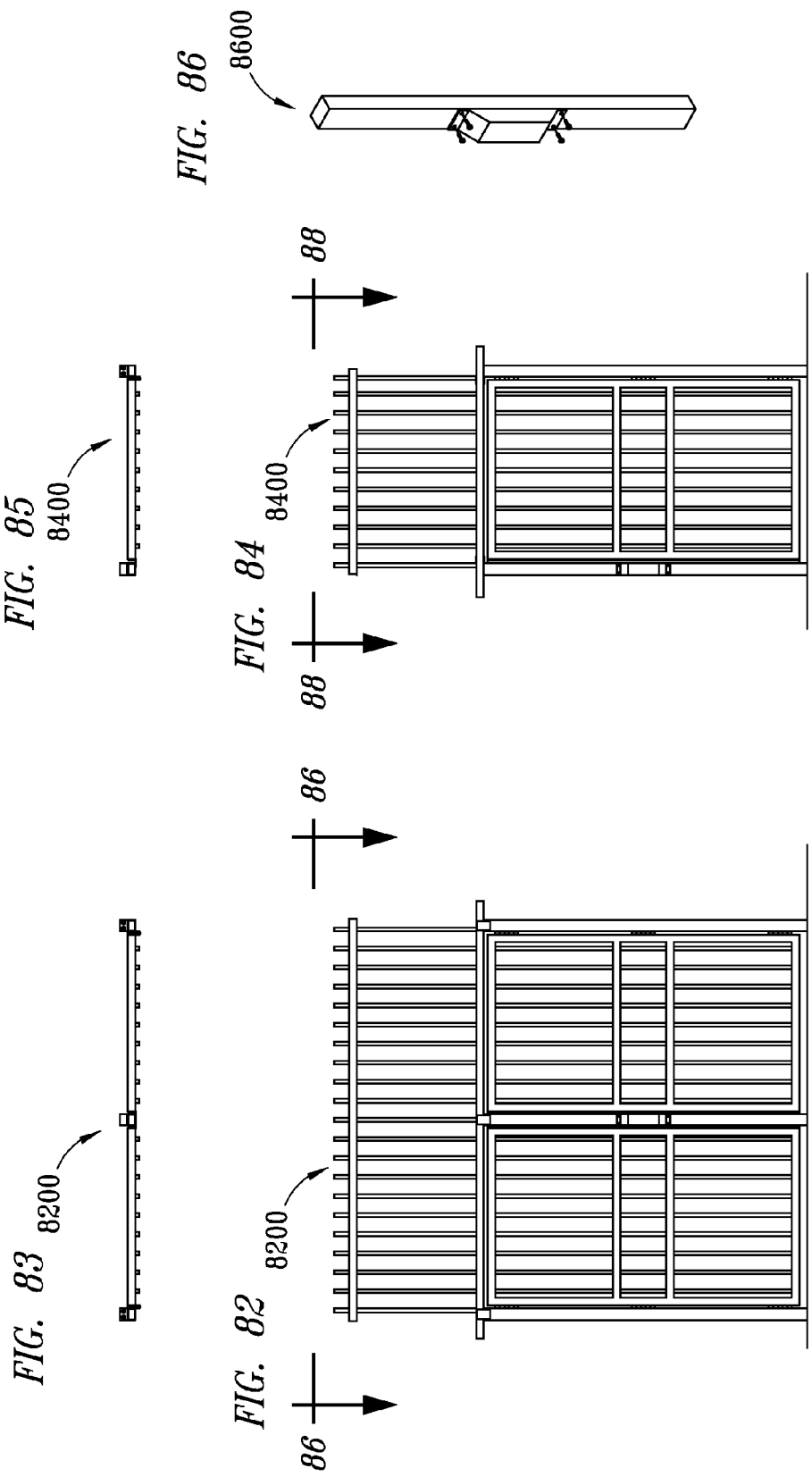

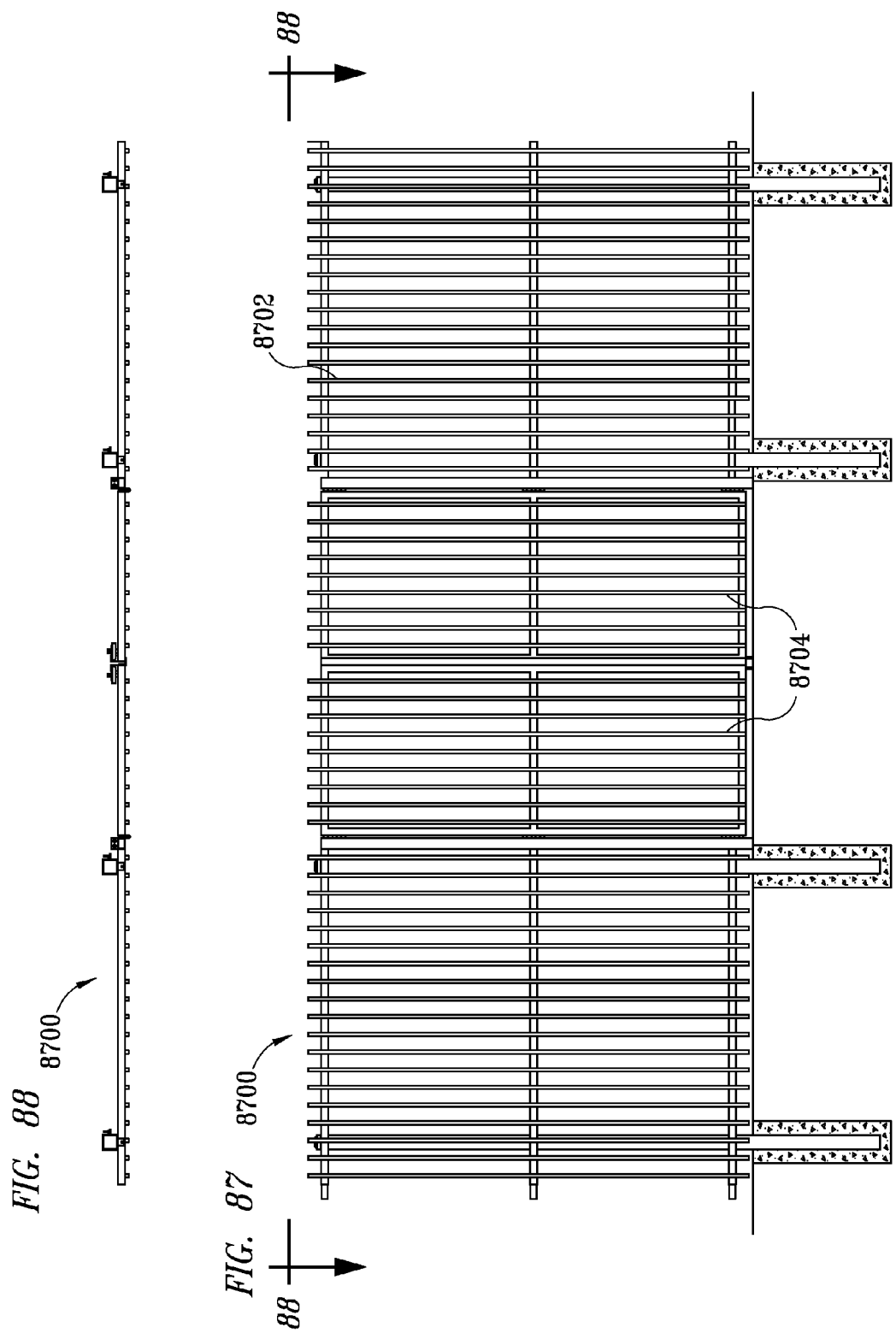

READILY INSTALLABLE FENCE SYSTEM, AND METHOD THEREFOR

CROSS-REFERENCE TO RELATED APPLICATIONS

This application claims the benefit of U.S. Provisional Application No. 60/763,715, filed Jan. 31, 2006, which is incorporated by reference herein its entirety.

TECHNICAL FIELD

The invention relates generally to fences, and more particularly, to a fence, and a method for making a fence, configured for quick installation and preferably also for providing ornamental security.

BACKGROUND

Fences are well known in the art for providing security to property. However, the installation of conventional fences can be laborious and inefficient. Attempts have been made to provide fences that are simpler and quicker to install, such as by providing mechanical fittings in place of welded fittings. However, mechanical fittings are often difficult to use, for example, with gates that are hung from posts that are spaced apart at irregularly intervals.

Not only can it be laborious and inefficient to install conventional fences, but conventional fences also lack aesthetic appeal.

Therefore, it would be desirable for a fence to not only provide security, but to also be relatively simple and quick to install and have aesthetic appeal.

SUMMARY

A fence includes a plurality of fence posts, and fence panels having rails which extend across the plurality of posts, and are secured thereto. Jambs may be formed onto the fence system, and one or more gates may be hung to the jambs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the accompanying drawings, in which:

FIGS. 15-17 exemplify an egress gate panic hardware mounting plate in accordance with principles of the present invention;

FIGS. 18-24 exemplify a square double tension band used to attach tension bars to middle rails at ends of panels in accordance with principles of the present invention.

FIGS. 25-28 exemplify a square single tension band used to attach tension bars to top and bottom rails at ends of panels in accordance with principles of the present invention;

FIGS. 29-30 exemplify a tension band used to attach chain link to rails in conjunction with tension rod brackets in accordance with principles of the present invention;

FIGS. 31-33 exemplify a chain link clip used to secure chain link to pickets in accordance with principles of the present invention;

FIGS. 34-35 exemplify a splice used to assemble gate sections in accordance with principles of the present invention;

FIGS. 36-37 exemplify a splice used to assemble gate sections in accordance with principles of the present invention;

FIGS. 38-41 exemplify a swivel bar hanger used to secure rail on sloping terrain applications in accordance with principles of the present invention;

FIGS. 42-45 exemplify square and round post caps in accordance with principles of the present invention;

FIGS. 46-47 exemplify the placement of carriage bolts with head facing rail in accordance with principles of the present invention;

FIG. 53 exemplifies a step in the assembly wherein posts are set in place;

FIGS. 54-55 exemplifies a step in the assembly wherein rail hangers are installed on the posts set in FIG. 54;

FIGS. 62-64 exemplify the application of chain link tension rods and rod brackets onto the panel assemblies of FIG. 61;

FIGS. 65-67 exemplify how the panels of FIG. 60 are lifted and positioned on the posts of FIGS. 54-55;

FIGS. 76-77 exemplify gate section construction detail for double gate with center post and transom;

FIGS. 78-79 exemplify gate section construction detail for a single gate with a transom;

FIGS. 80-81 exemplify gate section construction detail for a double gate with a drop rod and transom;

FIGS. 82-86 exemplifies an egress gate with panic hardware for a double gate with a center post and single gate; and FIGS. 87-88 exemplify gate section construction detail for a double gate with a drop rod.

DETAILED DESCRIPTION

Figure 1:
FIG. 1 exemplifies a carriage bolt and breakaway nut used to secure a rail hanger to a post in assembling a fence in accordance with principles of the present invention.
Figure 2:
FIG. 2 exemplifies a TEK screw used to secure a rail hanger to a post in assembling a fence in accordance with principles of the present invention.
Figure 3:
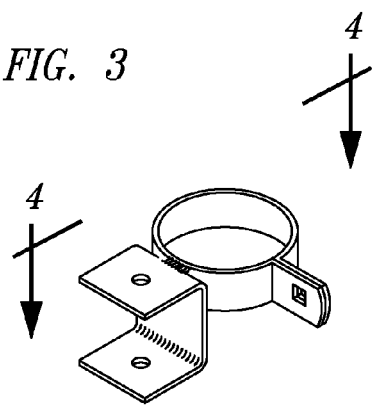
FIGS. 3-5 exemplify a round post rail hanger, used to secure a rail to a post in accordance with principles of the present invention.
Figure 4:
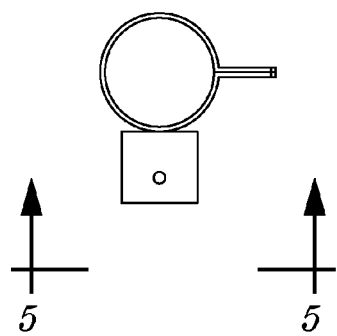
Figure 5:
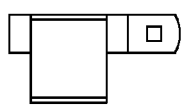
Figure 6:
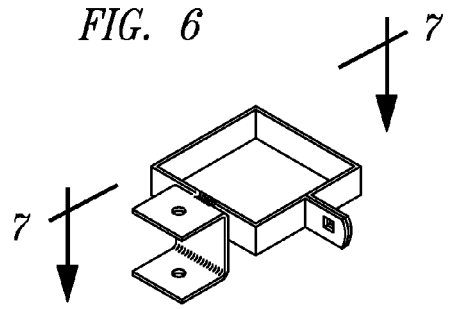
FIGS. 6-8 exemplify a square post rail hanger, used to secure a rail to a post in accordance with principles of the present invention.
Figure 7:
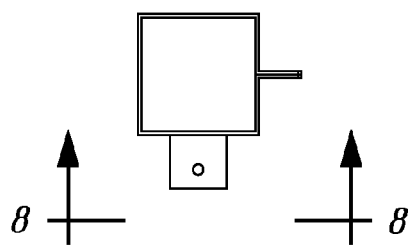
Figure 8:
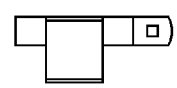
Figure 9:
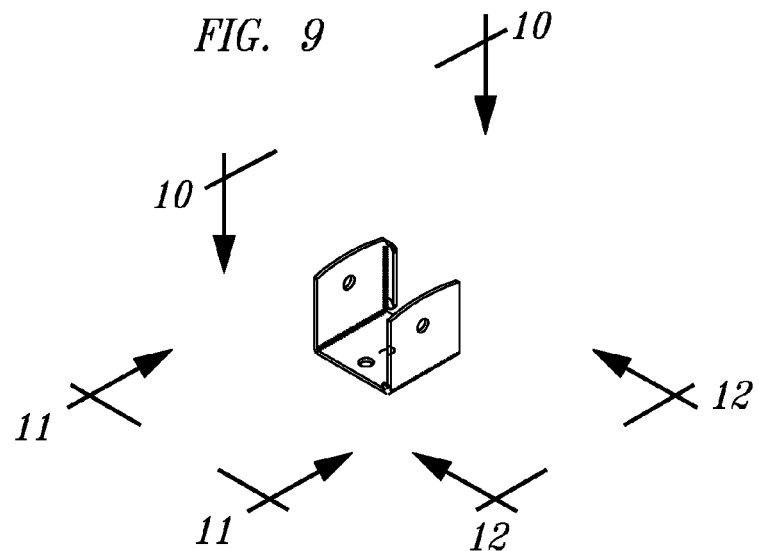
FIGS. 9-12 exemplify a panel hanger, used to secure a rail on an inside corner connection in accordance with principles of the present invention.
Figure 10:
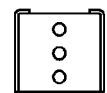
Figure 11:
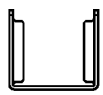
Figure 12:
Figure 13:
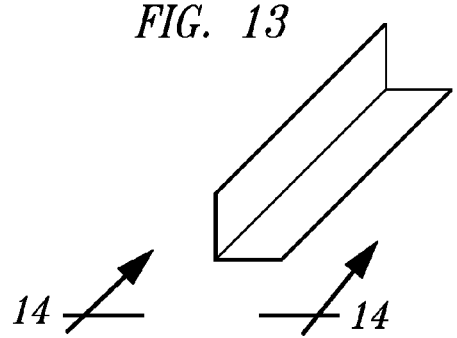
FIGS. 13-14 exemplify gate and hook trim in accordance with principles of the present invention.
Figure 14:
Figure 48:
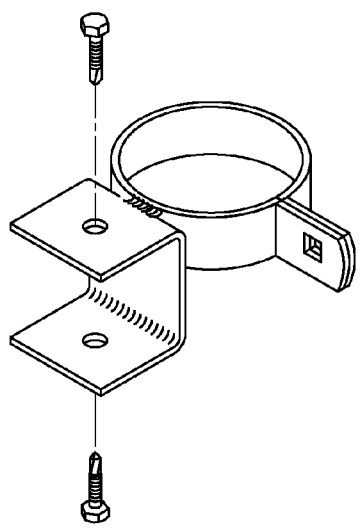
FIGS. 48-51 exemplify the location of TEK screws in accordance with principles of the present invention.
Figure 49:
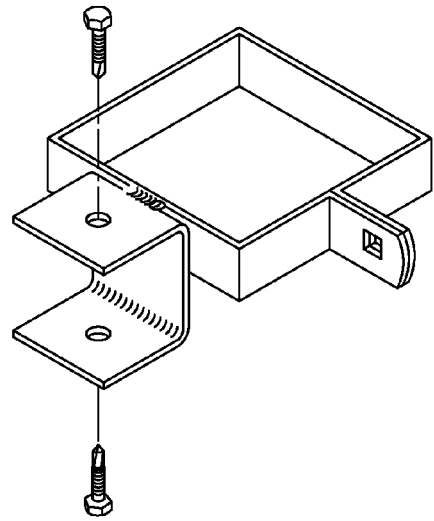
Figure 50:
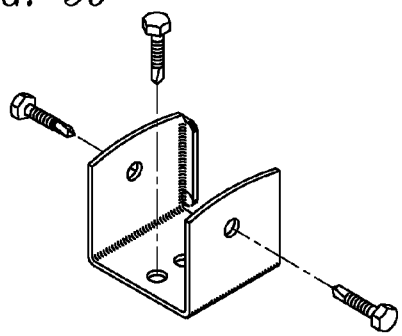
Figure 51:
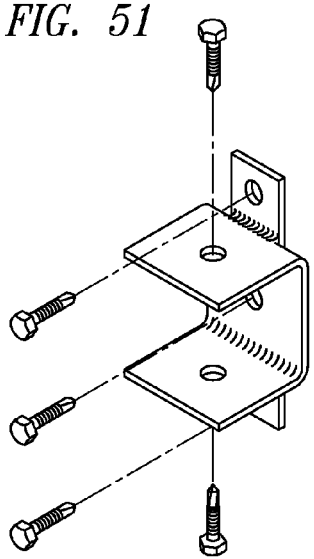

Refer now to the drawings wherein depicted elements are, for the sake of clarity, not necessarily shown to scale and wherein like or similar elements are designated by the same reference numeral through the several views. In the interest of conciseness, some components known to the art, and necessary for fences, have not been shown or discussed in detail, except insofar as necessary to describe the present invention.

The present invention constitutes a method for constructing an ornamental fence and for hanging gates that makes installation simpler and more efficient than is possible with existing systems by running the fence outside the line of the fence posts rather than in line with them.

A number of dimensions are depicted in the drawings. It is understood, however, that the dimensions depicted in the drawings are provided by way of example, and are not to be construed as constituting any limitation in the design or application of the embodiment of the invention described herein.

The fence of the present invention has a number of applications, particularly where ornamental fencing is required, including, but not limited to applications in connection with garden centers, recreational facilities, a commercial perimeter, a retail perimeter, and areas of transportation. Due to the configuration of the fence disclosed herein, it may be assembled relatively quickly and inexpensively, and is particularly well-suited for projects having irregular or inexact post settings.

As discussed in further detail below, in a preferred embodiment, the fence of the present invention may typically be assembled in five steps. First, fence posts are installed, or set, if not already set. The fence post settings or spacing does not have to be exact, because the fence runs outside the posts, rather than between them. Second, brackets are attached with a brace band attachment, which eliminates the need to tap into a heavy wall post. Third, fence panels to be used in the construction of the fence are assembled on the ground by being connected end-to-end using splices rather than welding. Fourth, sections of fence panels are assembled on the ground and then lifted from the ground, positioned onto the posts, and secured in place by being attached to the brackets. Fifth, gates are hung onto jambs integrated with the fence panels.

FIGS. 1-51 exemplify hardware and tools that are preferred in the assembly of the fence of the present invention. By way of example, but not limitation, fasteners, brackets, hangers, splices, and tension rods are types of hardware preferred in the assembly of the fence of the present invention. Drills, ladders, rubber mallets, wrenches, sockets, levels, and saws exemplify types of tools that would be preferred in the assembly of the fence of the present invention.

Figure 52:
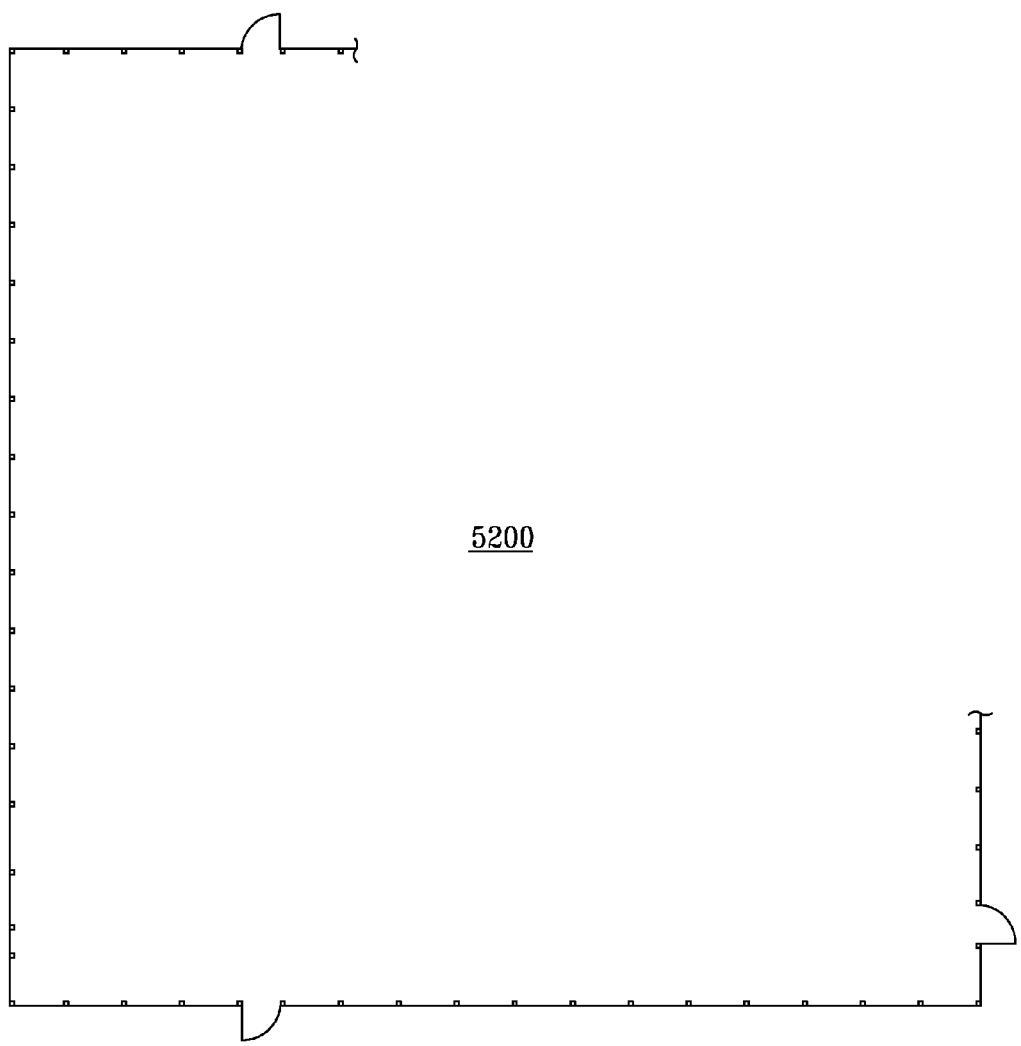
FIG. 52 exemplifies how a user may verify the area that needs to be secured using fencing according to the present invention.
Figure 56:
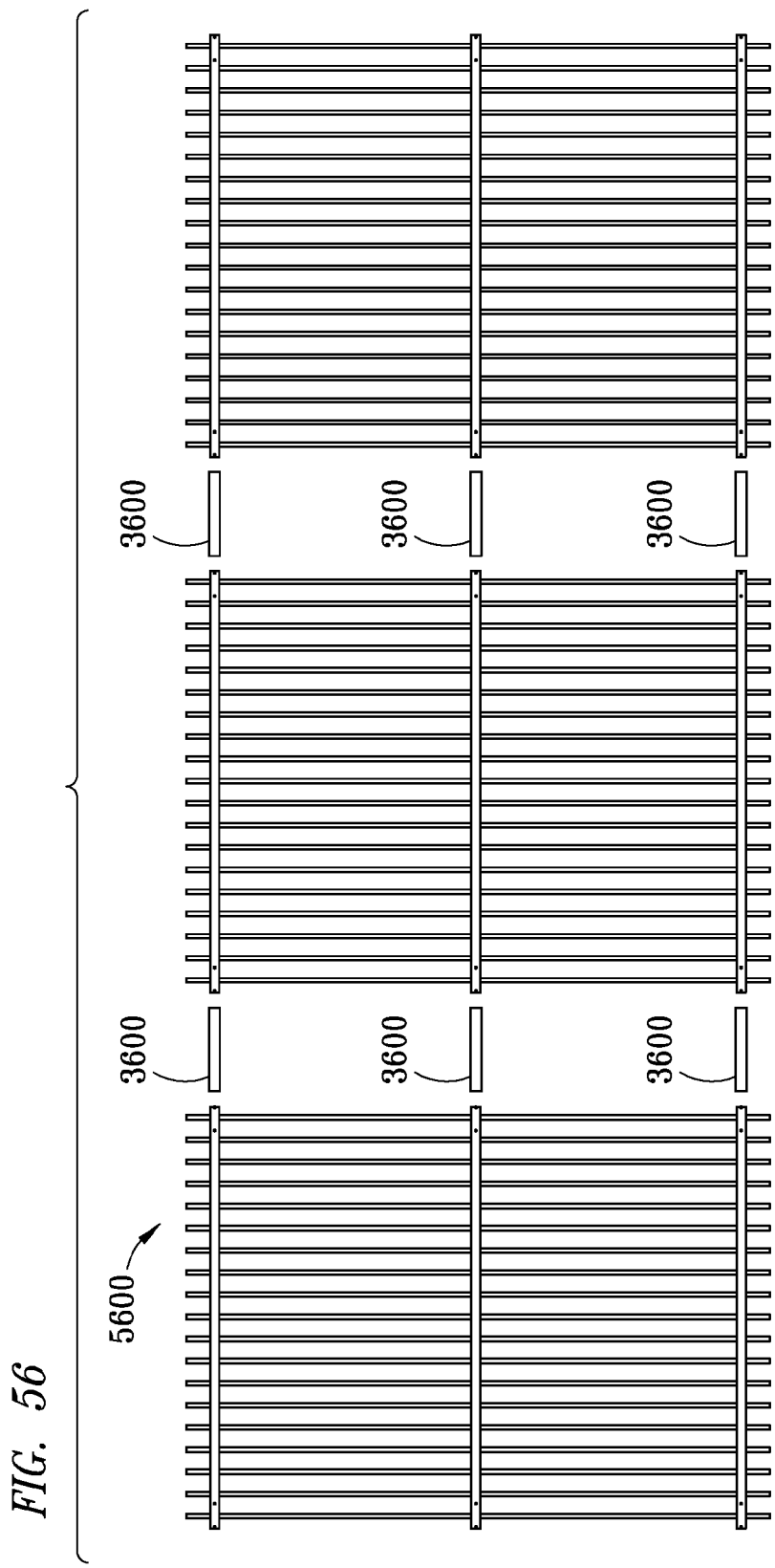
FIG. 56 exemplifies a layout of the assembly of panels for use with the fence.
Figures 57, 58:
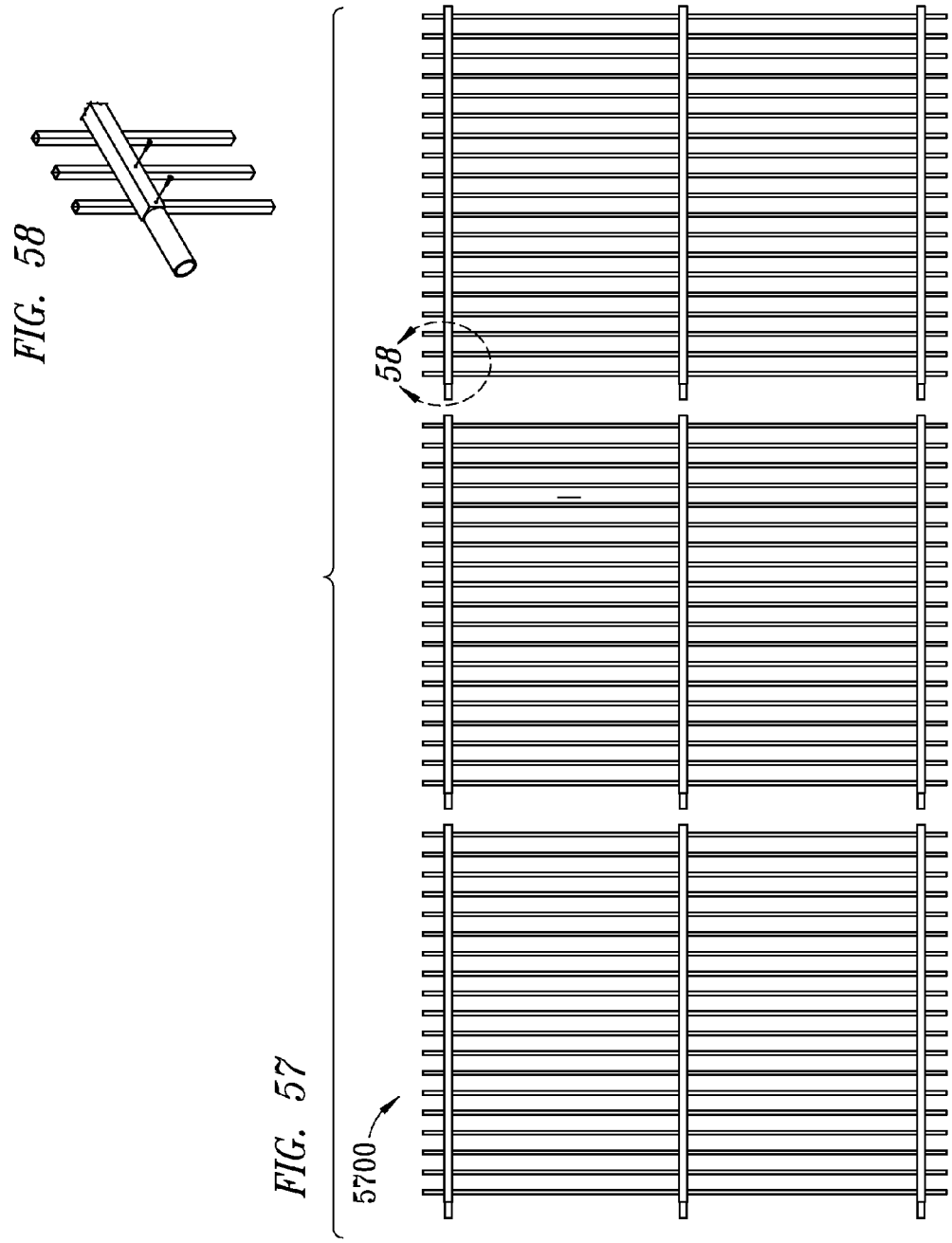
FIGS. 57-58 exemplifies the panel assemblies of FIG. 56 prepared for splice installation.
Figure 60:
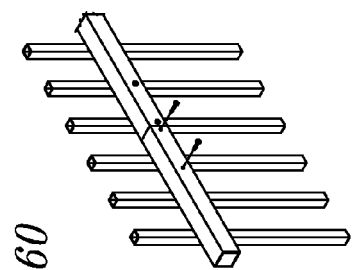
FIGS. 59-60 exemplify the panel assemblies of FIG. 57 pressed together.
Figure 59:
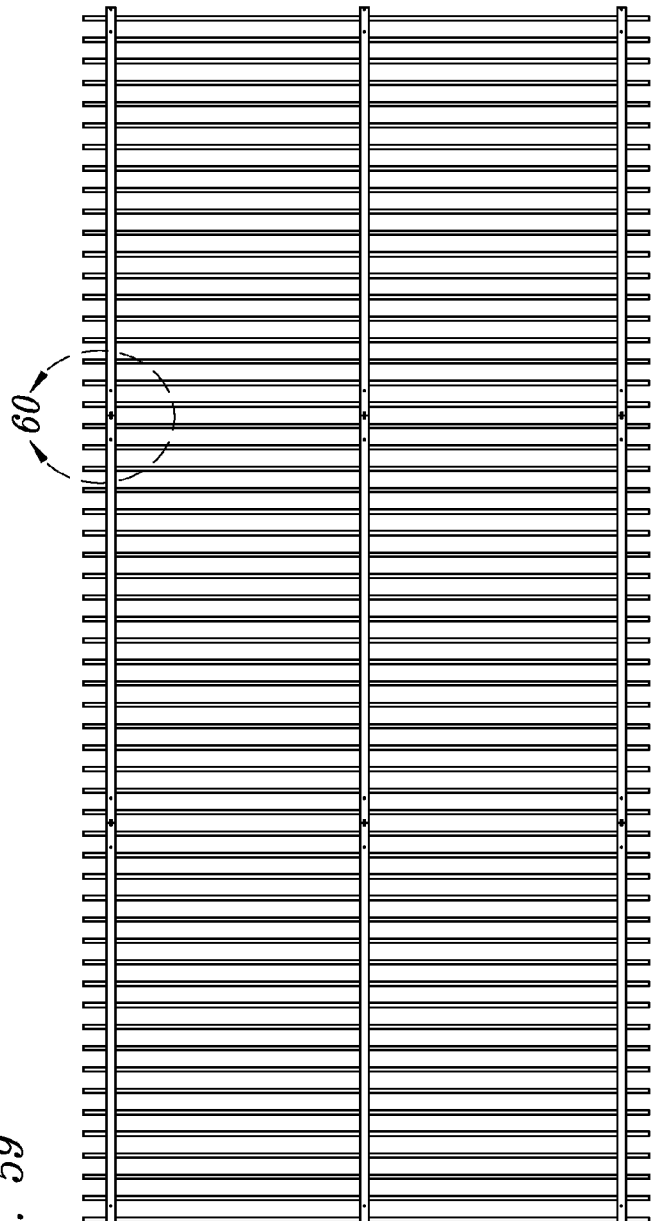

As shown in FIG. 52, before the fence of the present invention may be set up, the exact area to be fenced must be identified and verified. Locations must also be identified where gates are to be positioned to fence panels may be assembled accordingly, as described further below with respect to FIGS. 68-88.

As shown in FIG. 53, fence posts are preferably set in cement or concrete in the ground. The posts may be of any suitable height, and regularly or irregularly spaced. The posts may be fabricated of any suitable material, such as wood, steel, aluminum, channel, square beam, I-beam, or the like effective for supporting a fence.

FIGS. 54-55 exemplify how rail hangers are installed on the posts set in FIG. 53. In a preferred embodiment, hangers are attached to brackets which, in turn, are attached to the posts. Band brackets are secured to the posts to avoid the need to tap directly into the post, thereby further simplifying the assembly of the fence. Hangers for supporting rails on the panels, discussed in further detail below with respect to FIGS. 56-60, are attached to the brackets, preferably by the manufacturer of the fence product, in any suitable manner, such as, by way of example, but not limitation, welds, mechanical fasteners, or the like.

In accordance with principles of the present invention, fence panels are substantially prefabricated prior to being installed to form the fence. More specifically, the panels are fabricated in sections, each of which sections comprises a plurality of slats, also referred to as pickets, attached to rails, such as metal tubes, preferably having a square, or optionally a circular, cross-section. Then, as exemplified in FIG. 56, the panels are laid out on the ground with corresponding splices. The splices are preferably tubular, and sized for fitting within the rails. As shown in FIGS. 57-60, the splices are inserted into the respective rails, end-to-end, and preferably secured thereto using mechanical fasteners, such as TEK screws, thereby forming a continuous run of fence outside the line of the fence posts of FIGS. 53-55. While not shown in FIGS. 56-60, fence panels may also be fabricated with gate jambs, as needed with respect to FIGS. 68-88 below, by way of welding or mechanically fastening of the jambs to ends of rails.

Figure 61:
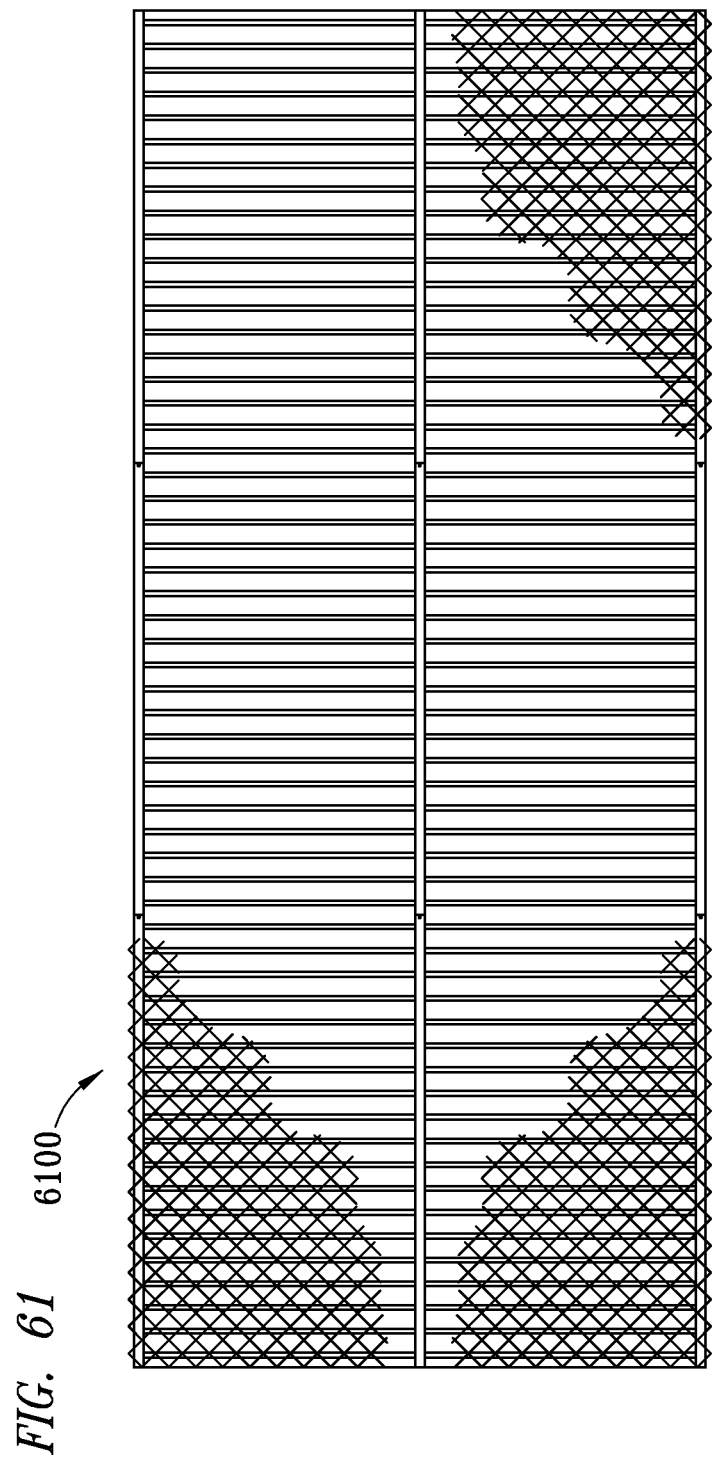
FIG. 61 exemplifies the overlay of chain link onto the assemblies of FIG. 58.

If additional security is desired, then the pickets of the fence panels may be overlaid with chain link. As shown in FIG. 61, chain is cut as desired to extend across a desired section of fence panel. Then, as shown in FIGS. 62-64, tension rod brackets are attached to ends of the fence panels, and tension rods are extended through the chain links at each end of the fence panel. Tension is then applied to the tension rods in opposing directions to thereby instill tension in the chain link, and the tension rods are secured by way of the tension rods brackets.

Figure 67:
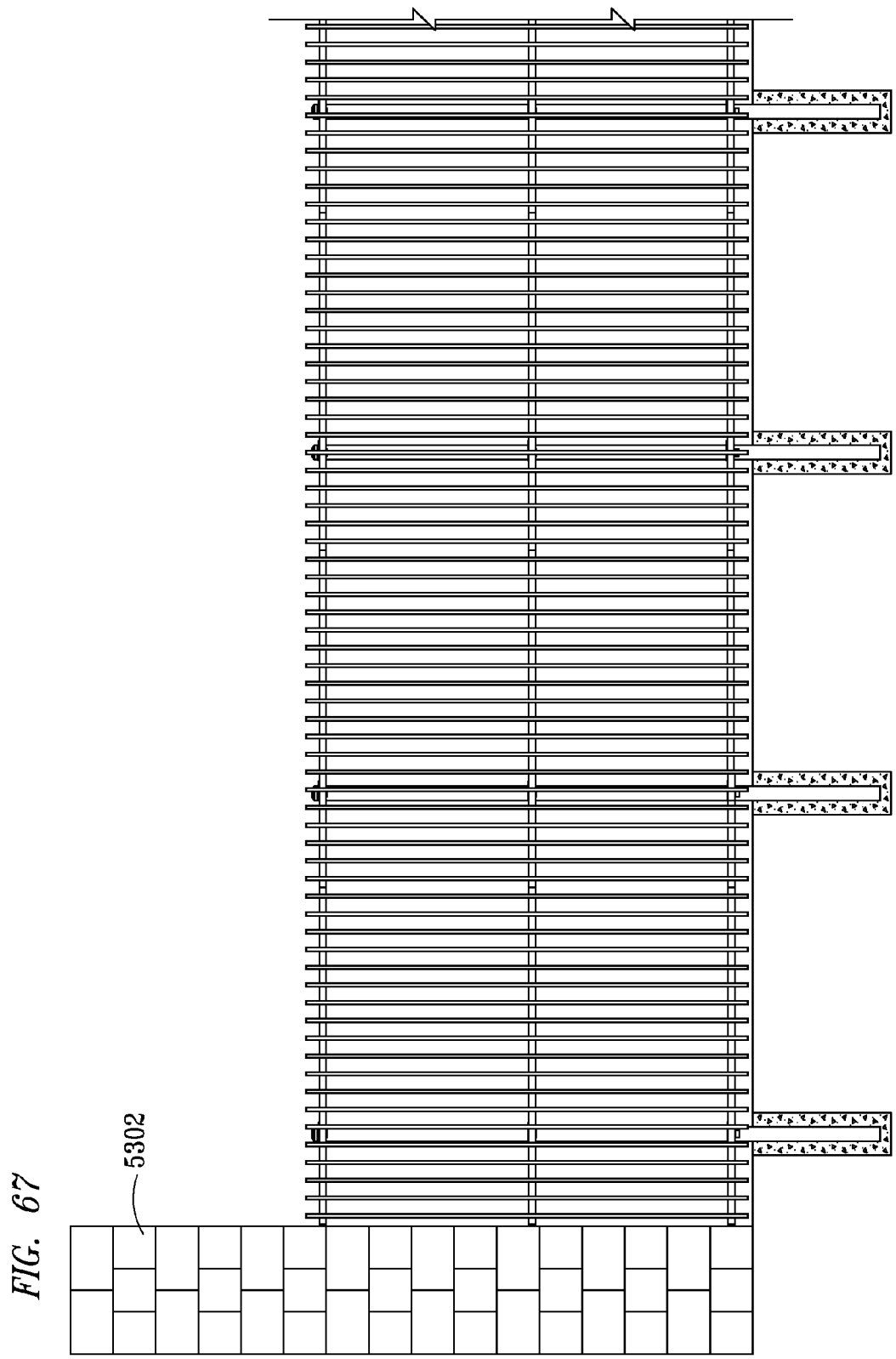
Figure 68:
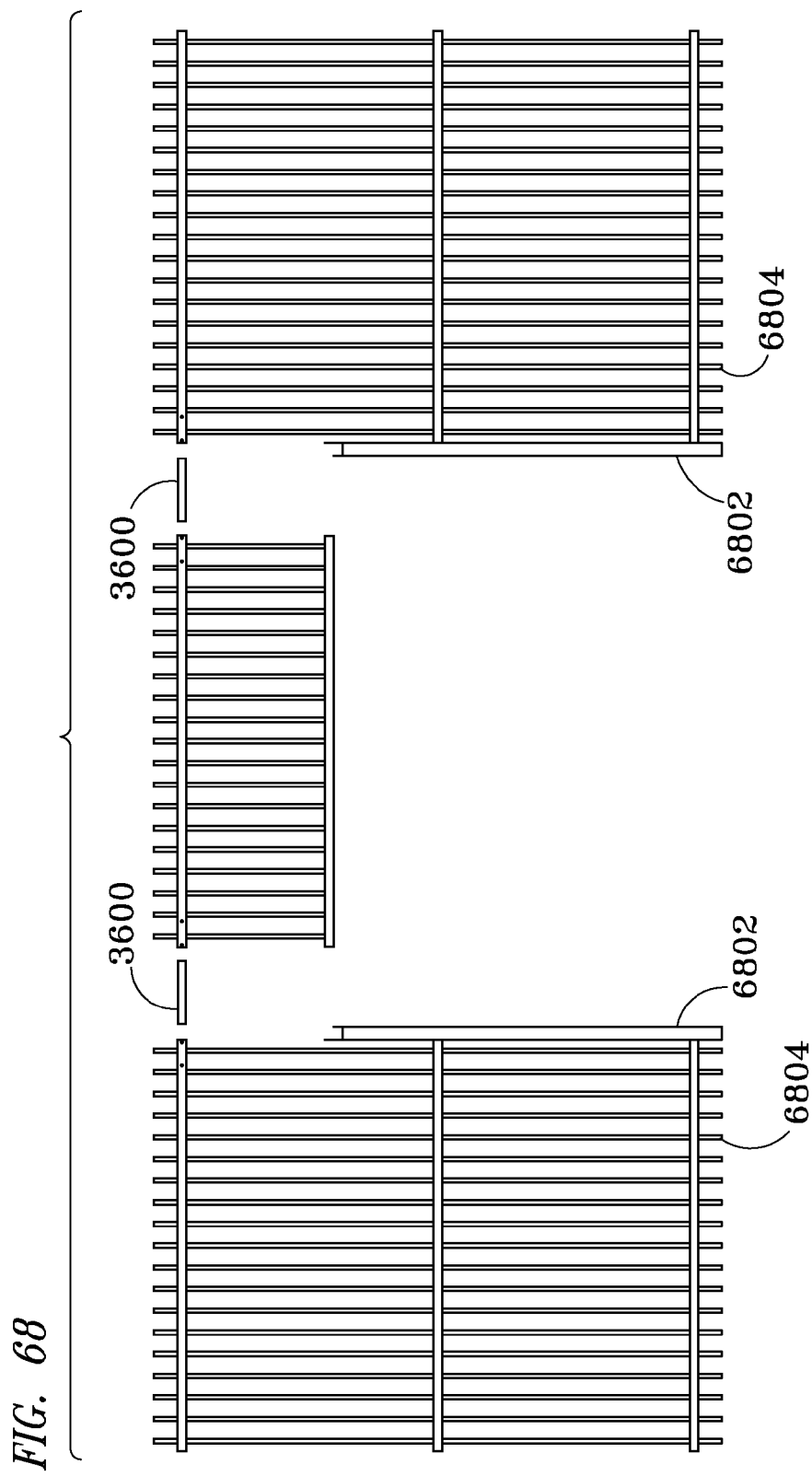
FIG. 68 exemplifies a layout of gate panel assemblies prepared for assembly according to principles of the present invention.
Figure 70:
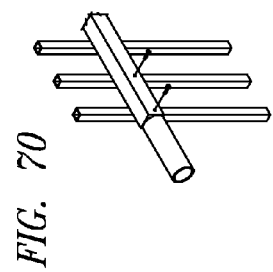
FIGS. 69-70 exemplifies the gate panel assemblies of FIG. 63 prepared for splice installation.
Figure 69:
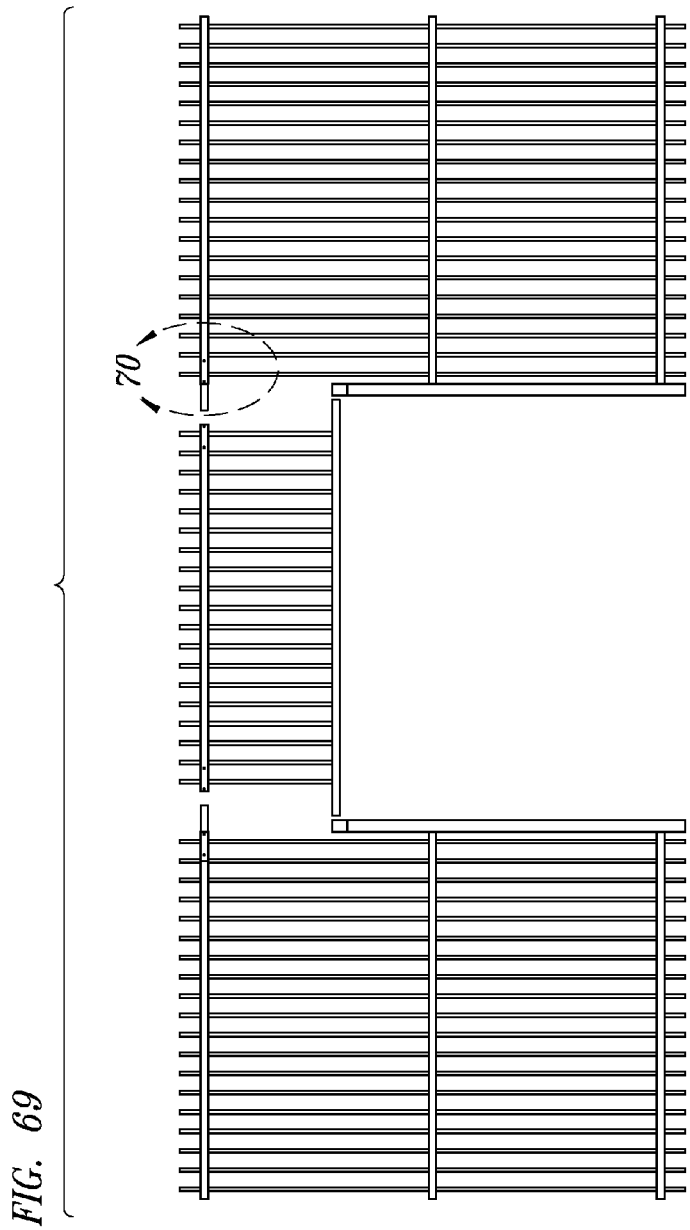
Figure 72:
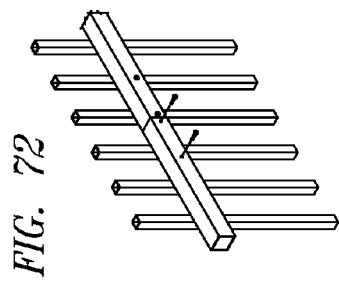
FIGS. 71-72 exemplifies the gate panel assemblies of FIG. 64 pressed together.
Figure 71:
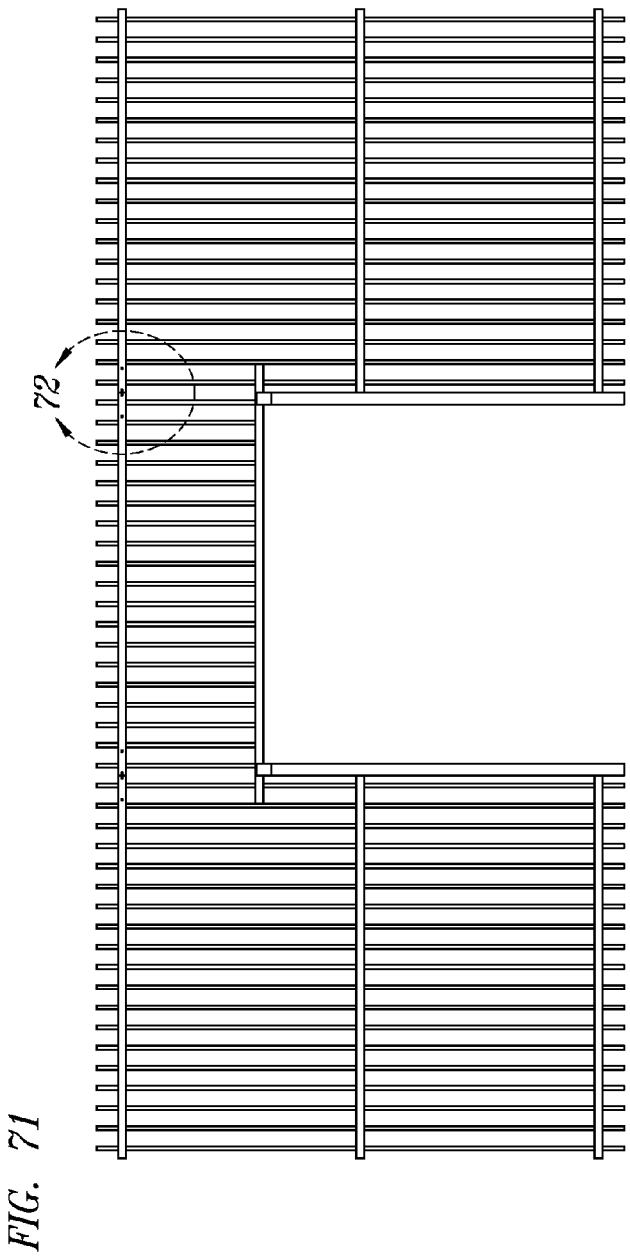

In FIGS. 65-66, a section of fence panel (with or without chain link) is lifted and positioned on the posts of FIGS. 53-55, and secured to the brackets, preferably by way of mechanical fasteners, such as TEK screws. As shown in FIG. 67, additional sections of fence panel are subsequently lifted and positioned on the posts, spliced together as described above with respect to FIGS. 56-60, and respective rails of the fence panels are secured to the rail hangers bracketed to the fence posts.

Once the fence panels are secured to the posts, gates are installed as determined with respect to FIG. 52 above. As depicted in FIGS. 68-72, selected fence panels are preferably pre-fabricated with gate jambs positioned in suitable locations for hanging a gate therefrom. Further to FIGS. 56-60, two fence panels are laid on the ground, and a third, or transom, fence panel is interposed between the two fence panels, the transom fence panel being less wide the first two fence panels. At least one rail of the transom fence panel is spliced to corresponding rails of the other two fence panels, and a lowermost rail of the transom fence panel is preferably mechanically connected, e.g., by way of a plate, to an upper end of respective gate jambs, to thereby form "gate" panels.

Figure 73:
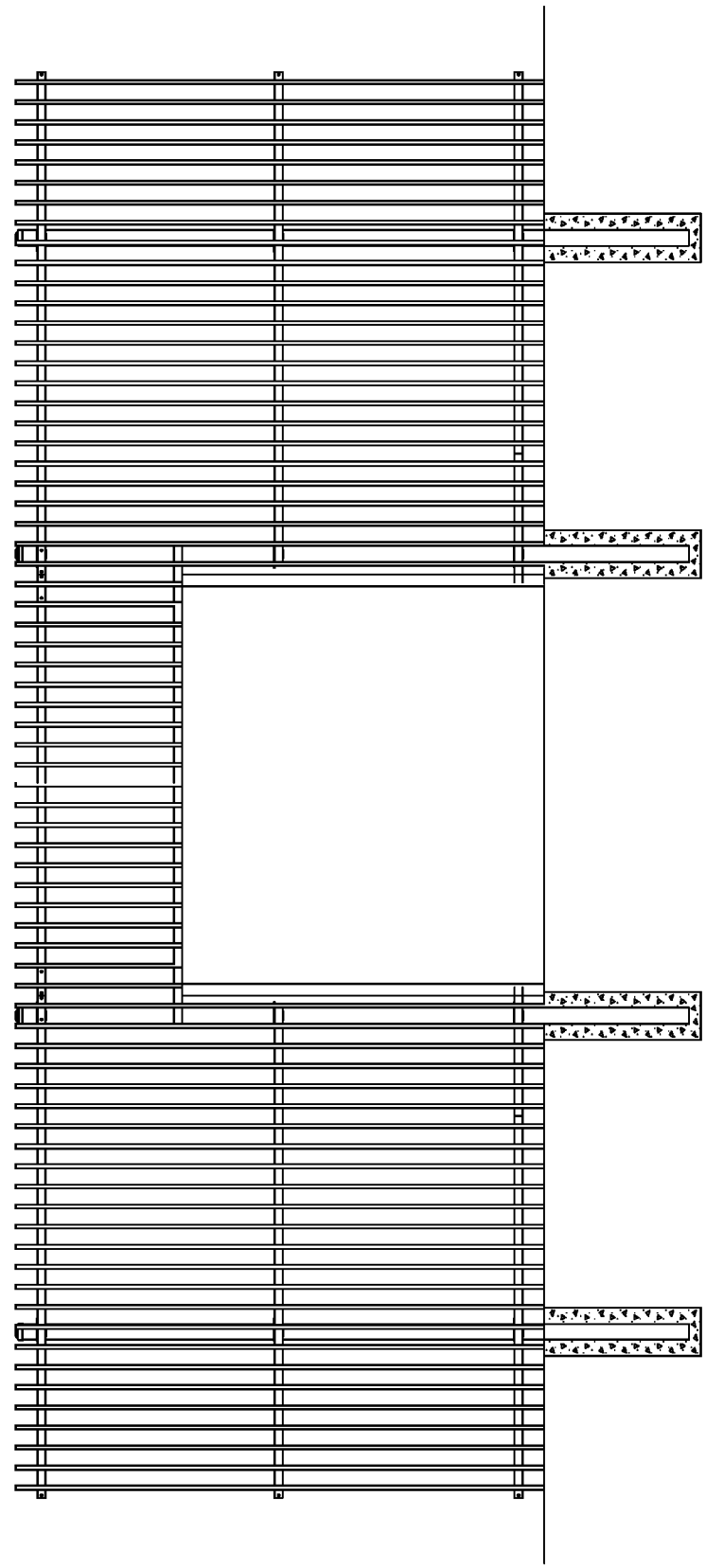
FIG. 73 exemplifies the gate panel assemblies of FIG. 65 may be lifted and positioned onto the posts of FIGS. 54-55.

As shown in FIG. 73, the gate panels are lifted, as described above with respect to FIGS. 65-67, and spliced into the fence system with other fence panel sections. A lowermost end, or base, of each gate jamb is preferably secured, e.g., by way of a mechanical fastener such an anchor bolt, to a post, or cement in which a post is embedded, for additional strength and stability.

Figure 74:
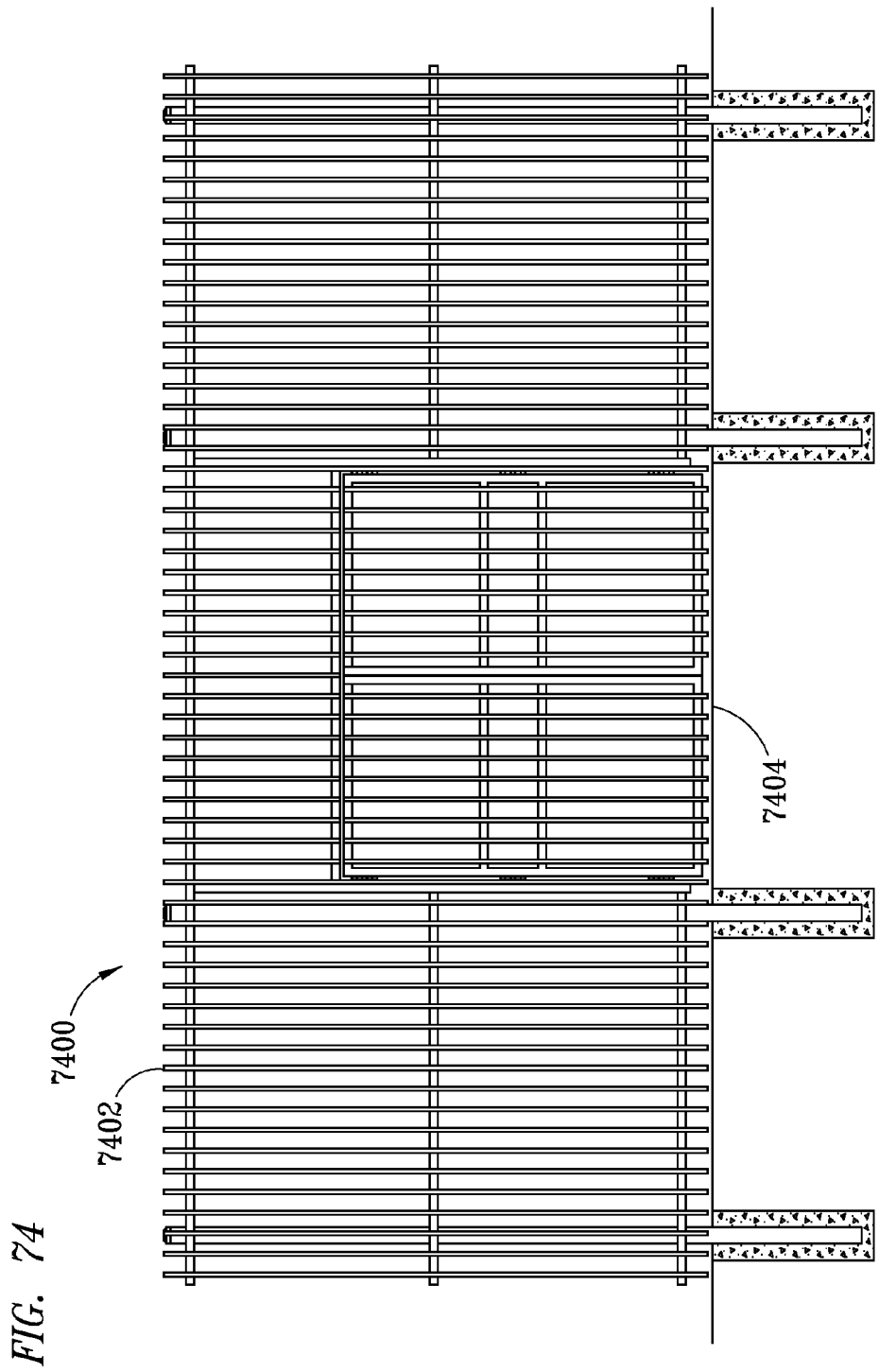
FIG. 74 exemplifies the installation of a gate gates to the posts and panel assemblies of FIG. 66.

As depicted in FIG. 74, gates are secured to the gate jambs of the gate panels, by way of hinges which are preferably welded to respective gate jambs. One or more gates are thus hung on a jamb system attached to fence rails near a connection with a post, thereby enabling substantially precise control over the placement of the gate and size of the opening. If the posts are open on top, then caps are preferably positioned on the posts to close the tops thereof.

Figure 75:
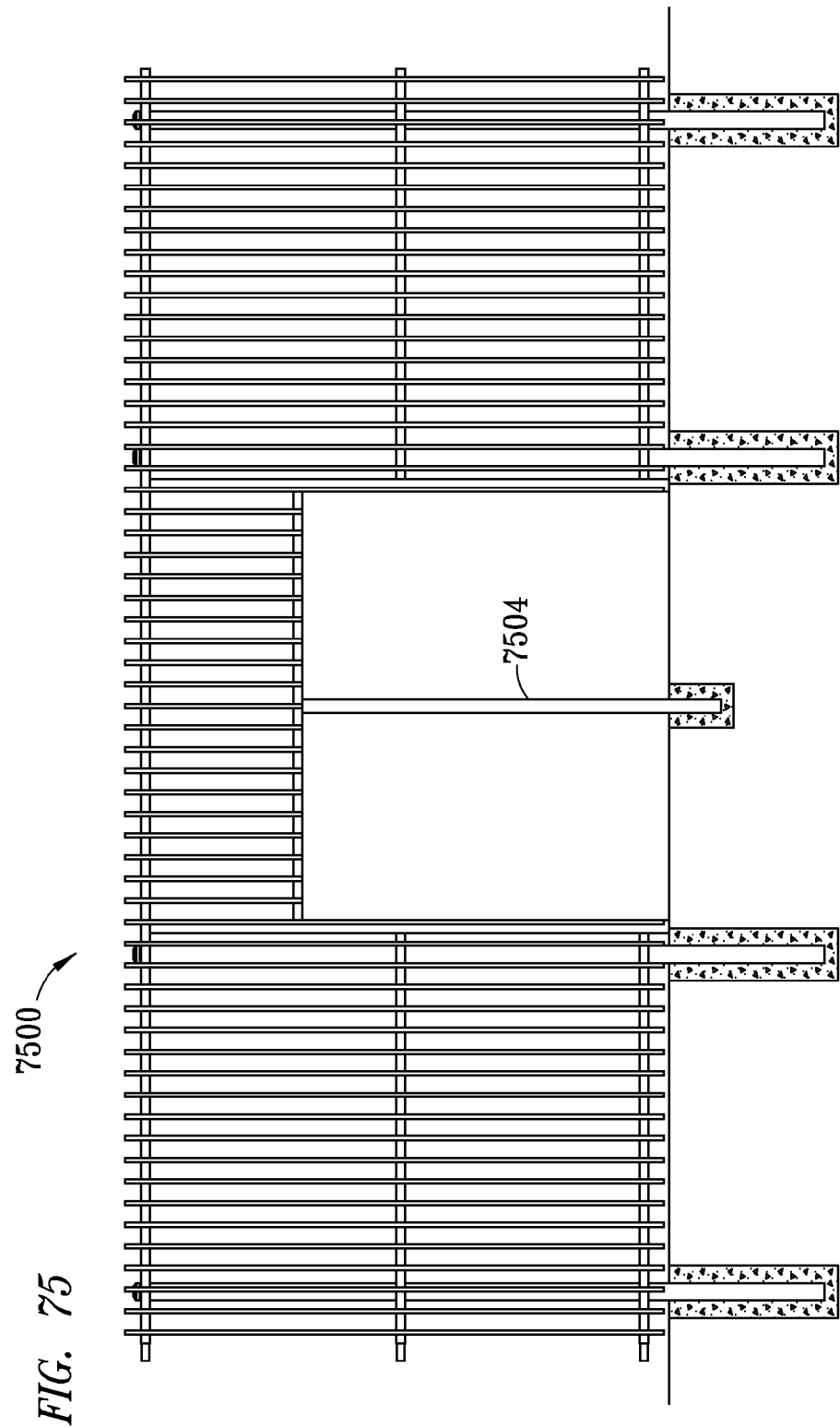
FIG. 75 exemplifies the installation of a mullion post where applicable for a gate.

FIG. 75 exemplifies the optional installation of a center post, or mullion post, which may be positioned as suitable in support of the aforementioned gate and transom fence panel. A lower end of such a mullion post is preferably set in concrete (or cement), and an upper end thereof is preferably secured to a rail by way of a plate tack welded between the mullion post and the rail.

FIGS. 76-88 exemplify various options available for gates in accordance with principles of the present invention. More specifically, FIGS. 76-77 depict gate section construction detail for a double gate with a center post and transom. FIGS. 78-79 depict gate section construction detail for a single gate with a transom. FIGS. 80-81 depict gate section construction detail for a double gate with a drop rod and transom. FIGS. 82-86 depict an egress gate section construction detail with panic hardware for (1) a double gate with a center post and transom, and (2) a single gate with a center post and transom. FIGS. 87-88 gate section construction detail for a double gate with a drop rod.

By use of the present invention, a fence may be installed faster (e.g., about twice as fast) than conventional fences. Furthermore, posts that are positioned near footers may be set up to about 36 inches from a termination point of a fence line. The fence of the present invention also preferably forms a conduit for running cables through the rail system, making it very useful in high security applications that require tamper detection fiber optics and communications cables.

It is understood that the present invention may take many forms and embodiments. Accordingly, several variations may be made in the foregoing without departing from the spirit or the scope of the invention. For example, the fence may optionally be made with rails made from channel.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A fence comprising:
   a plurality of posts;
   at least a first fence panel and at least a second fence panel, each of said at least a first fence panel and at least a second fence panel having at least one picket extending across each of at least two tubular rails such that said at least one picket is in a separate plane than said at least two tubular rails, which at least two rails extend across each of selected ones of said plurality of posts such that the at least two rails are in a separate plane than the selected ones of said plurality of posts, and are secured thereto; and
   at least one tubular splice for coupling one of said at least two rails of said at least a first fence panel to a respective one of said at least two rails of said at least a second fence panel, thereby forming a continuous conduit from one of said at least two rails of said at least a first fence panel to a respective one of said at least two rails of said at least a second fence panel;
   said at least one tubular splice inserted in respective ends of said one of said at least two rails of said at least a first fence panel and said respective one of said at least two rails of said at least a second fence panel such that:
      said at least one tubular splice, said one of said at least two rails of said at least a first fence panel, and said respective one of said at least two rails of said at least a second fence panel form a continuous rail in a separate plane than each of said selected ones of said plurality of posts, said at least one picket of said at least a first fence panel, and said at least one picket of said at least a second fence panel; and
      said at least a first fence panel and said at least a second fence panel form a continuous section of fence panel;
   wherein said fence further comprises a third fence panel and a fourth fence panel, each of said third and fourth fence panels having at least one picket extending across at least two tubular rails, which at least two rails extend across selected ones of said plurality of posts, and are secured thereto, said third panel being a transom fence panel, wherein:
      said third fence panel is positioned between said second fence panel and said fourth fence panel;
      at least one rail of said third fence panel is coupled to a respective one of said at least two rails of said second fence panel using a second tubular splice;
      said least one rail of said third fence panel is coupled to a respective one of said at least two rails of said fourth fence panel using a third tubular splice; and
      said second, third, and fourth fence panels forming a gate panel adapted to receive a gate coupled to a gate jamb of said gate panel.

2. The fence of claim 1, further comprising:
   at least one jamb formed onto said at least one first fence panel; and
   at least one gate hung onto said at least one jamb.

3. The fence of claim 1, wherein said at least one splice is sized for fitting within said one of said at least two rails of said at least a first fence panel and said respective one of said at least two rails of said at least a second fence panel.

4. The fence of claim 1, wherein said at least one splice is sized for fitting within said one of said at least two rails of said at least a first fence panel and within said respective one of said at least two rails of said at least a second fence panel, said fence further comprising mechanical fasteners for securing said at least one splice within said respective ones of said at least two rails.

5. The fence of claim 1, said fence further comprising at least one cable running through said conduits.

6. The fence of claim 1, comprising a mullion post positioned below said third fence panel and attached to at least one rail of said third fence panel.

7. The fence of claim 1, wherein said plurality of posts comprises at least three posts, a first post being spaced from a second post at a different distance than a third post is spaced from said second post.

8. The fence of claim 1, wherein said at least two rails are secured to said selected ones of said plurality of posts using one or more rail hangers installed on said selected ones of said plurality of posts.

9. The fence of claim 8, wherein:
 a bracket is attached to each of said selected ones of said plurality of posts; and
 each of said one or more rail hangers is secured to a respective one of said selected ones of said plurality of posts using at least one of said brackets.

10. The fence of claim 1, comprising chain link overlaying at least said first fence panel.

11. The fence of claim 1, said at least one picket of said first fence panel having been attached said at least two rails of said first fence panel prior to securing said at least two rails of said first fence panel to said selected ones of said plurality of posts.

12. A fence comprising:
 a plurality of posts;
 at least a first fence panel and at least a second fence panel, each of said at least a first fence panel and at least a second fence panel having at least one picket extending across at least two tubular rails such that said at least one picket is in a separate plane than said at least two tubular rails, the at least two rails extending across selected ones of said plurality of posts such that said first and second fence panels are in a separate plane than said plurality of posts, and are secured thereto, said at least two rails being secured to said selected ones of said plurality of posts using one or more rail hangers installed on said selected ones of said plurality of posts using one or more brackets; and
 at least one tubular splice for coupling one of said at least two rails of said at least a first fence panel to a respective one of said at least two rails of said at least a second fence panel, thereby forming a continuous conduit from one of said at least two rails of said at least a first fence panel to a respective one of said at least two rails of said at least a second fence panel;
 said at least one tubular splice inserted in respective ends of said one of said at least two rails of said at least a first fence panel and said respective one of said at least two rails of said at least a second fence panel such that:
 said at least one tubular splice, said one of said at least two rails of said at least a first fence panel, and said respective one of said at least two rails of said at least a second fence panel form a continuous rail in a separate plane than each of said selected ones of said plurality of posts, said at least one picket of said at least a first fence panel, and said at least one picket of said at least a second fence panel; and
 said at least a first fence panel and said at least a second fence panel form a continuous section of fence panel;
 wherein said fence further comprises a third fence panel and a fourth fence panel, each of said third and fourth fence panels having at least one picket extending across at least two tubular rails, which at least two rails extend across selected ones of said plurality of posts, and are secured thereto, said third panel being a transom fence panel, wherein:
 said third fence panel is positioned between said second fence panel and said fourth fence panel;
 at least one rail of said third fence panel is coupled to a respective one of said at least two rails of said second fence panel using a second tubular splice;
 said least one rail of said third fence panel is coupled to a respective one of said at least two rails of said fourth fence panel using a third tubular splice; and
 said second, third, and fourth fence panels forming a gate panel adapted to receive a gate coupled to a gate jamb of said gate panel.

13. The fence of claim 12, wherein said at least one splice is sized for fitting within said one of said at least two rails of said at least a first fence panel and said respective one of said at least two rails of said at least a second fence panel.

14. The fence of claim 12, wherein said at least one splice is sized for fitting within said one of said at least two rails of said at least a first fence panel and within said respective one of said at least two rails of said at least a second fence panel, said fence further comprising mechanical fasteners for securing said at least one splice within said respective ones of said at least two rails.

15. The fence of claim 12, said fence further comprising at least one cable running through said conduits.

16. The fence of claim 12, wherein said plurality of posts comprises at least three posts, a first post being spaced from a second post at a different distance than a third post is spaced from said second post.

17. The fence of claim 12, said at least one picket of said first fence panel having been attached said at least two rails of said first fence panel prior to securing said at least two rails of said first fence panel to said selected ones of said plurality of posts.

* * * * *